(12) United States Patent
Pain et al.

(10) Patent No.: US 11,795,561 B2
(45) Date of Patent: Oct. 24, 2023

(54) ELECTROCHEMICAL-DEPOSITION SYSTEM, APPARATUS, AND METHOD USING OPTICALLY-CONTROLLED DEPOSITION ELECTRODES

(71) Applicant: FABRIC8LABS, INC., San Diego, CA (US)

(72) Inventors: David Pain, Carlsbad, CA (US); Andrew Edmonds, Oceanside, CA (US)

(73) Assignee: FABRIC8LABS, INC., San Diego, CA (US)

( * ) Notice: Subject to any disclaimer, the term of this patent is extended or adjusted under 35 U.S.C. 154(b) by 0 days.

(21) Appl. No.: 17/879,636

(22) Filed: Aug. 2, 2022

(65) Prior Publication Data

US 2023/0031781 A1 Feb. 2, 2023

Related U.S. Application Data

(60) Provisional application No. 63/228,365, filed on Aug. 2, 2021.

(51) Int. Cl.
*C25D 5/10* (2006.01)
*C25D 21/12* (2006.01)
(Continued)

(52) U.S. Cl.
CPC ............ *C25D 5/011* (2020.08); *C25D 5/10* (2013.01); *C25D 17/10* (2013.01); *C25D 21/12* (2013.01); *B33Y 10/00* (2014.12); *B33Y 30/00* (2014.12)

(58) Field of Classification Search
CPC .............. C25D 5/024; B29C 64/264–291
See application file for complete search history.

(56) References Cited

U.S. PATENT DOCUMENTS 4,575,330 A 3/1986 Hull
4,678,282 A 7/1987 Yaniv et al.
(Continued)

FOREIGN PATENT DOCUMENTS

CN 104178782 12/2014
CN 204097583 1/2015
(Continued)

OTHER PUBLICATIONS

Frey et al., "Switch-matrix-based High-Density Microelectrode Array in CMOS Technology", IEEE Journal of Solid-State-Circuits, Feb. 2010, pp. 467-482, vol. 45, No. 2.
(Continued)

*Primary Examiner* — Hosung Chung
(74) *Attorney, Agent, or Firm* — Kunzler Bean & Adamson

(57) ABSTRACT

An electrochemical-deposition apparatus includes an electrode array, a photoconductor, an electrically conductive layer, an electromagnetic-radiation emitter, an electric-power source, and a controller. The controller is configured to direct electric power to be supplied from the electric-power source to the electrically conductive layer and direct the electromagnetic-radiation emitter to generate electromagnetic radiation. When the electric power is supplied to the electrically conductive layer and when the electromagnetic radiation is generated, the photoconductor is illuminated at a first radiation level and a first level of electric current is enabled through the photoconductor and the at least one deposition electrode. When the electric power is supplied to the electrically conductive layer and when the electromagnetic radiation is generated, the photoconductor is illuminated at a second radiation level and a second level of electric current is enabled through the photoconductor and the at least one deposition electrode.

20 Claims, 15 Drawing Sheets

(51) Int. Cl.
*C25D 17/10* (2006.01)
*B33Y 30/00* (2015.01)
*B33Y 10/00* (2015.01)
*C25D 5/00* (2006.01)

(56) References Cited

U.S. PATENT DOCUMENTS

| | | |
|---|---|---|
| 5,132,820 A | 6/1992 | Someya et al. |
| 5,403,460 A | 4/1995 | Sala et al. |
| 5,641,391 A | 6/1997 | Hunter et al. |
| 5,998,805 A | 12/1999 | Shi et al. |
| 6,036,834 A | 3/2000 | Clerc |
| 7,839,831 B2 | 11/2010 | Vrcelj et al. |
| 8,168,540 B1 | 5/2012 | Reid et al. |
| 8,681,077 B2 | 3/2014 | Kimura |
| 9,777,385 B2 | 10/2017 | Wirth et al. |
| 10,465,307 B2 | 11/2019 | Pain et al. |
| 10,724,146 B1 | 7/2020 | Pain et al. |
| 10,914,000 B1 | 2/2021 | Pain et al. |
| 10,947,632 B1 | 3/2021 | Pain et al. |
| 11,232,956 B2 | 1/2022 | Pain et al. |
| 11,313,035 B2 | 4/2022 | Pain et al. |
| 11,313,036 B2 | 4/2022 | Pain et al. |
| 11,401,603 B2 | 8/2022 | Pain et al. |
| 2001/0014409 A1 | 8/2001 | Cohen |
| 2003/0006133 A1 | 1/2003 | Metzger |
| 2004/0129573 A1 | 7/2004 | Cohen |
| 2005/0045252 A1 | 3/2005 | Yamasaki et al. |
| 2005/0176238 A1 | 8/2005 | Cohen et al. |
| 2005/0183959 A1 | 8/2005 | Wilson et al. |
| 2005/0202660 A1 | 9/2005 | Cohen et al. |
| 2005/0223543 A1 | 10/2005 | Cohen et al. |
| 2006/0283539 A1 | 12/2006 | Slafer |
| 2007/0068819 A1 | 3/2007 | Singh et al. |
| 2007/0089993 A1 | 4/2007 | Schwartz et al. |
| 2007/0221504 A1 | 9/2007 | Yuefeng |
| 2010/0300886 A1 | 12/2010 | Lin et al. |
| 2011/0210005 A1 | 9/2011 | Van Den Bossche et al. |
| 2017/0145584 A1 | 5/2017 | Wirth et al. |
| 2018/0265997 A1* | 9/2018 | Mora ............... C25D 5/022 |
| 2019/0160594 A1 | 5/2019 | Flamm et al. |
| 2021/0047744 A1 | 2/2021 | Biton |

FOREIGN PATENT DOCUMENTS

| | | |
|---|---|---|
| CN | 104593830 | 5/2015 |
| WO | 2017087884 | 5/2017 |
| WO | 2019150362 | 8/2019 |
| WO | 2021041265 | 3/2021 |

OTHER PUBLICATIONS

Stewart et al., "Polysilicon TFT Technology for Active Matrix OLED Displays", IEEE Transactions on Electron Devices, May 2001, pp. 845-851, vol. 48, No. 5.
International Search Report and Written Opinion for PCT/US2020/047531 dated Sep. 29, 2020.
Supplementary International Search Report for PCT/US2020/047531 dated Nov. 22, 2021.
U.S. Appl. No. 17/554,677, filed Dec. 17, 2021.
U.S. Appl. No. 17/566,546, filed Dec. 30, 2021.
U.S. Appl. No. 17/535,437, filed Nov. 24, 2021.
U.S. Appl. No. 17/738,729, filed May 6, 2022.
U.S. Appl. No. 17/863,272, filed Jul. 12, 2022.
Nakamura et al., Incorporation of input function into displays using LTPS TFT technology, Journal of the SID, 2006, pp. 363-369, Apr. 2014.

* cited by examiner

ELECTROCHEMICAL-DEPOSITION SYSTEM, APPARATUS, AND METHOD USING OPTICALLY-CONTROLLED DEPOSITION ELECTRODES

CROSS-REFERENCE TO RELATED APPLICATION

This application claims the benefit of U.S. Provisional Patent Application No. 63/228,365, filed Aug. 2, 2021, which is incorporated by reference in its entirety.

FIELD

This disclosure relates generally to manufacturing parts, and more particularly to systems and methods for manufacturing parts using electrochemical additive manufacturing techniques.

BACKGROUND

Electrochemical additive manufacturing utilizes electrochemical reactions to manufacture parts in an additive manufacturing manner. In an electrochemical additive manufacturing process, a metal part is constructed by plating charged metal ions onto a surface in contact with an electrolytic solution. This technique relies on placing an electrode physically close to a substrate in the presence of an electrolytic solution, and energizing the electrode, which causes an electric charge to flow through the electrode, the electrolytic solution, and the substrate. The flow of electric charge induces an electrochemical reduction reaction to occur, at the substrate near the electrode, and a deposition of material, from the electrolytic solution, on the substrate.

Although electrochemical additive manufacturing techniques provide distinct advantages over other types of additive manufacturing processes, such as selective laser melting and electron beam melting, controlling the flow of electric charge through the electrode, the electrolytic solution, and the substrate in a reliable, an efficient and an accurate manner can be difficult.

SUMMARY

The subject matter of the present application has been developed in response to the present state of the art, and in particular, in response to the shortcomings of conventional systems and methods for additive manufacturing of parts, that have not yet been fully solved by currently available techniques. Accordingly, the subject matter of the present application has been developed to provide systems and methods for the electrochemical additive manufacturing of parts that overcome at least some of the above-discussed shortcomings of prior art techniques.

The following is a non-exhaustive list of examples, which may or may not be claimed, of the subject matter, disclosed herein.

Disclosed herein is an electrochemical-deposition apparatus that comprises an electrode array, which comprises deposition electrodes. The electrochemical-deposition apparatus also comprises a photoconductor that is electrically coupled with at least one of the deposition electrodes. The electrochemical-deposition apparatus additionally comprises an electrically conductive layer that is electrically coupled with the photoconductor and positioned so that the photoconductor is electrically interposed between the at least one deposition electrode and the electrically conductive layer. The electrochemical-deposition apparatus further comprises an electromagnetic-radiation emitter that is configured to generate electromagnetic radiation and is positioned so that when generated, at least a portion of the electromagnetic radiation illuminates the photoconductor, an electric-power source, configured to supply electric power to the electrically conductive layer, and a controller. The controller is configured to direct the electric power to be supplied from the electric-power source to the electrically conductive layer and direct the electromagnetic-radiation emitter to generate the electromagnetic radiation when the electric power is supplied to the electrically conductive layer. When the electric power is supplied to the electrically conductive layer and when the electromagnetic radiation is generated, so that the photoconductor is illuminated at a first radiation level, a first level of electric current is enabled through the photoconductor and the at least one deposition electrode. When the electric power is supplied to the electrically conductive layer and when the electromagnetic radiation is generated, so that the photoconductor is illuminated at a second radiation level, a second level of electric current is enabled through the photoconductor and the at least one deposition electrode. The second level of the electric current is different than the first level of the electric current. The preceding subject matter of this paragraph characterizes example 1 of the present disclosure.

The electrically conductive layer is interposed between the electromagnetic-radiation emitter and the photoconductor. When generated, at least a portion of the electromagnetic radiation passes through the electrically conductive layer and illuminates the photoconductor. The preceding subject matter of this paragraph characterizes example 2 of the present disclosure, wherein example 2 also includes the subject matter according to example 1, above.

The electrically conductive layer comprises an electrically conductive material that is at least partially transparent to the at least the portion of the electromagnetic radiation. The preceding subject matter of this paragraph characterizes example 3 of the present disclosure, wherein example 3 also includes the subject matter according to example 2, above.

The electromagnetic radiation is one of visible light or non-visible light. The electrically conductive material is transparent to the one of the visible light or the non-visible light. The preceding subject matter of this paragraph characterizes example 4 of the present disclosure, wherein example 4 also includes the subject matter according to example 3, above.

The electrically conductive material comprises an aperture, through which the at least the portion of the electromagnetic radiation is passable from the electromagnetic-radiation emitter to the photoconductor. The preceding subject matter of this paragraph characterizes example 5 of the present disclosure, wherein example 5 also includes the subject matter according to any of examples 3 or 4, above.

The electrically conductive layer further comprises an electrically non-conductive substrate. The electrically non-conductive substrate is at least partially transparent to the at least the portion of the electromagnetic radiation. The electrically non-conductive substrate is interposed between the electrically conductive material and the electromagnetic-radiation emitter so that, when generated, the at least the portion of the electromagnetic radiation passes through the electrically non-conductive substrate. The preceding subject matter of this paragraph characterizes example 6 of the present disclosure, wherein example 6 also includes the subject matter according to any of examples 3-5, above.

The electrochemical-deposition apparatus further comprises a photoconductor array that comprises a plurality of photoconductors. The photoconductor is one of the plurality of photoconductors and each one of the plurality of photoconductors is electrically coupled with a corresponding one or more of the plurality of deposition electrodes. The electromagnetic-radiation emitter is configured to generate the electromagnetic radiation so that, when generated, at least the portion of the electromagnetic radiation illuminates any one or more of the plurality of photoconductors. The preceding subject matter of this paragraph characterizes example 7 of the present disclosure, wherein example 7 also includes the subject matter according to any of examples 1-6, above.

When the electromagnetic radiation is generated, the electromagnetic radiation illuminates at least two of the plurality of photoconductors, a first one of the at least two of the plurality of photoconductors receives a first quantity of the electromagnetic radiation, a second one of the at least two of the plurality of photoconductors receives a second quantity of the electromagnetic radiation, and the first quantity is different than the second quantity. The preceding subject matter of this paragraph characterizes example 8 of the present disclosure, wherein example 8 also includes the subject matter according to example 7, above.

The electromagnetic-radiation emitter is movable, relative to the photoconductor array. The preceding subject matter of this paragraph characterizes example 9 of the present disclosure, wherein example 9 also includes the subject matter according to any of examples 7-8, above.

The electromagnetic-radiation emitter comprises a plurality of electromagnetic-radiation-generating elements, spaced apart from each other and each configured to one of selectively generate the electromagnetic radiation, or selectively permit the electromagnetic radiation to pass therethrough. The preceding subject matter of this paragraph characterizes example 10 of the present disclosure, wherein example 10 also includes the subject matter according to any of examples 7-9, above.

The electromagnetic-radiation emitter comprises a laser. The electromagnetic radiation is a laser beam. The preceding subject matter of this paragraph characterizes example 11 of the present disclosure, wherein example 11 also includes the subject matter according to any of examples 1-10, above.

The electromagnetic-radiation emitter comprises a light-emitting diode. The preceding subject matter of this paragraph characterizes example 12 of the present disclosure, wherein example 12 also includes the subject matter according to any of examples 1-11, above.

The electromagnetic-radiation emitter comprises a liquid crystal display and a backlight source. The liquid crystal display is interposed between the backlight source and the photoconductor. The preceding subject matter of this paragraph characterizes example 13 of the present disclosure, wherein example 13 also includes the subject matter according to any of examples 1-12, above.

Further disclosed herein is an electrochemical-deposition system that comprises an electrolytic solution and a target electrode, which is positionable so that a surface of the target electrode is in direct physical contact with the electrolytic solution. The electrochemical-deposition system further comprises an electrochemical-deposition apparatus, which comprises a deposition electrode that is positionable so that a surface of the deposition electrode is in direct physical contact with the electrolytic solution. The electrochemical-deposition apparatus further comprises a photoconductor that is electrically coupled with the deposition electrode. The electrochemical-deposition apparatus additionally comprises an electrically conductive layer that is electrically coupled with the photoconductor and positioned so that the photoconductor is electrically interposed between the deposition electrode and the electrically conductive layer. The electrochemical-deposition apparatus also comprises an electromagnetic-radiation emitter that is configured to generate electromagnetic radiation and positioned so that when generated, at least a portion of the electromagnetic radiation illuminates the photoconductor, which, when the surface of the target electrode and the surface of the deposition electrode are in direct physical contact with the electrolytic solution, establishes an electric current through the photoconductor, the deposition electrode, the electrolytic solution, and the target electrode to electroplate a quantity of electrically charged material in the electrolytic solution onto the surface of the target electrode. The preceding subject matter of this paragraph characterizes example 14 of the present disclosure.

The electrochemical-deposition apparatus further comprises a plurality of deposition electrodes and a plurality of photoconductors, each electrically coupled with a corresponding one of the plurality of deposition electrodes. The electromagnetic-radiation emitter is configured to selectively generate separate quantities of the electromagnetic-radiation so that, when generated at least a portion of each one of the separate quantities of the electromagnetic radiation illuminates a corresponding one or corresponding ones of the plurality of photoconductors. The preceding subject matter of this paragraph characterizes example 15 of the present disclosure, wherein example 15 also includes the subject matter according to example 14, above.

When the surface of the target electrode and the surface of the deposition electrode are in direct physical contact with the electrolytic solution, the electrically conductive layer is interposed between the electromagnetic-radiation emitter and the photoconductor, and when generated, at least a portion of the electromagnetic radiation passes through the electrically conductive layer and illuminates the photoconductor. The preceding subject matter of this paragraph characterizes example 16 of the present disclosure, wherein example 16 also includes the subject matter according to any of examples 14-15, above.

Additionally disclosed herein is a method of electroplating a target electrode that comprises establishing direct physical contact between a surface of the target electrode and an electrolytic solution, comprising electrically charged material, establishing direct physical contact between a surface of a deposition electrode and the electrolytic solution, and supplying electric power to an electrically conductive layer. The method additionally comprises delivering at least a portion of electromagnetic radiation to a photoconductor that is electrically coupled with the deposition electrode and with the electrically conductive layer, so that an electric current is established through the electrically conductive layer, the photoconductor, the deposition electrode, the electrolytic solution, and the target electrode, and so that a quantity of the electrically charged material in the electrolytic solution is electroplated onto at least a portion of the surface of the target electrode in direct physical contact with the electrolytic solution. The preceding subject matter of this paragraph characterizes example 17 of the present disclosure.

Establishing direct physical contact between the surface of the deposition electrode and the electrolytic solution comprises establishing direct physical contact between surfaces of a plurality of deposition electrodes and the electrolytic solution. Delivering the at least the portion of the electromagnetic radiation to the photoconductor comprises delivering the at least the portion of the electromagnetic radiation to at least two of a plurality of photoconductors or delivering a plurality of amounts of the electromagnetic-radiation to a corresponding one or multiple ones of the plurality of photoconductors. The preceding subject matter of this paragraph characterizes example 18 of the present disclosure, wherein example 18 also includes the subject matter according to example 17, above.

Delivering the at least the portion of the electromagnetic radiation to the photoconductor comprises adjusting at least one of an intensity or a quantity of the at least the portion of the electromagnetic radiation delivered to the photoconductor so that an amplitude of the electric current, established through the electrically conductive layer, the photoconductor, the deposition electrode, the electrolytic solution, and the target electrode, is adjusted, and the quantity of the electrically charged material electroplated onto the at least the portion of the surface of the target electrode is adjusted. The preceding subject matter of this paragraph characterizes example 19 of the present disclosure, wherein example 19 also includes the subject matter according to any of examples 17 or 18, above.

Delivering the at least the portion of the electromagnetic radiation further comprises passing the at least the portion of the electromagnetic radiation through the electrically conductive layer before delivering the at least the portion of the electromagnetic radiation to the photoconductor. The preceding subject matter of this paragraph characterizes example 20 of the present disclosure, wherein example 20 also includes the subject matter according to any of examples 17-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein are examples of an electrochemical-deposition system, apparatus, and method for constructing a metal part by depositing charged metal ions onto a surface in contact with an electrolytic solution. Electrochemical-deposition manufacturing includes placement of a printhead, including a deposition electrode (e.g., anode), physically close to a target electrode (e.g., cathode) in the presence of a deposition solution (e.g., an electrolytic solution), and energizing the deposition electrode, which causes an electric current (i.e., electric power) to flow through the deposition electrode, the deposition solution, and the target electrode. The flow of the electric current creates an electrochemical reduction reaction to occur at the target electrode, near the deposition electrode, which results in the deposition of material on the target electrode.

Reliable, efficient, and accurate energizing of the deposition electrode promotes reliable, efficient, and accurate deposition of material on the target electrode. Instead of using wires (e.g., traces) and a drive circuit to activate deposition electrodes, the electrochemical-deposition system, apparatus, and manufacturing process of the present disclosure alternatively uses electromagnetic radiation to activate the deposition electrodes. Using electromagnetic radiation promotes smaller deposition electrodes, and thus more precise deposition of material on the target electrode. Additionally, using electromagnetic radiation enables larger overall areas of deposition to be deposited on the target electrode at the same time.

Figure 1:
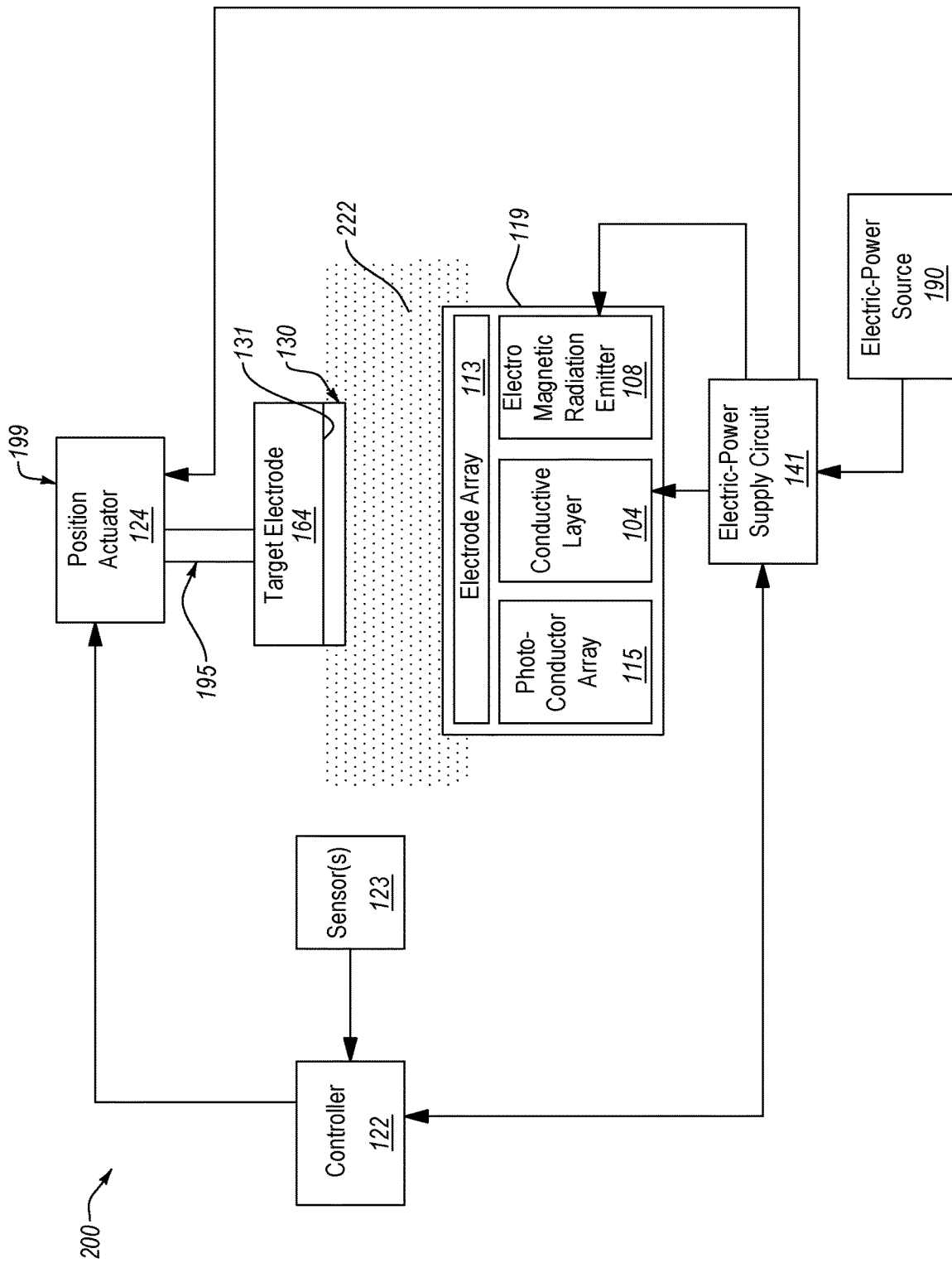
FIG. 1 is a schematic, side elevation view of an electrochemical-deposition system for manufacturing a part, according to one or more examples of the present disclosure.

Referring to FIG. 1, according to some examples, an electrochemical-deposition system 200 includes a printhead 119 that includes an electrode array 113. In some examples, the electrode array 113 includes an array of deposition electrodes 102 (see, e.g., FIGS. 2-8). The deposition electrodes 102 of the electrode array 113 are organized into a matrix arrangement, in some examples, thereby supporting a high resolution of deposition electrodes 102. According to certain examples, the deposition electrodes 102 of the electrode array 113 are arranged into a two-dimensional grid going into and/or coming out of the page, as viewed in FIGS. 2-8. The deposition electrodes 102 are made of any of various electrically conductive materials, such as a platinum-group metal, copper, a copper alloy, and the like.

Referring to FIGS. 2-8, the deposition electrodes 102 of the electrode array 113 are electrically isolated from each other via insulation 126 made of an electrically non-conductive material. More specifically, the insulation 126 is interposed between adjacent ones of the deposition electrodes 102. Moreover, to promote precision and accuracy, the insulation 126 can wrap around the outer peripheral edges of the electrode array 113 to help insulate the outer peripheral edges of the electrode array 113 from the electrolytic solution 222 and to help prevent short circuits.

The printhead 119 additionally includes a photoconductor array 115. The photoconductor array 115 includes an array of photoconductors 116 (see, e.g., FIGS. 2-11B). The arrangement of the photoconductors 116 of the photoconductor array 115 complements the arrangement of the deposition electrodes 102 of the electrode array 113. More specifically, in some examples, the photoconductors 116 are organized into a matrix arrangement, thereby supporting a high resolution of photoconductors 116. In the illustrated example, each one of the photoconductors 116 is electrically coupled with a corresponding one of the deposition electrodes 102. According to certain examples, each one of the photoconductors 116 contacts a corresponding one of the deposition electrodes 102. More specifically, each one of the photoconductors 116 includes an anode terminal, in electrical contact with the corresponding one of the deposition electrodes 102, and a cathode terminal.

Referring to FIGS. 2-11B, the photoconductors 116 of the photoconductor array 115 are electrically isolated from each other via the insulation 126. More specifically, the insulation 126 is interposed between adjacent ones of the photoconductors 116. Moreover, to protect the photoconductors 116 from corrosion, vis-à-vis contact with the electrolytic solution 222, the insulation 126 can wrap around the outer peripheral edges of the photoconductor array 115 to help insulate the outer peripheral edges of the photoconductor array 115 from the electrolytic solution 222.

Each one of the photoconductors 116 is any of various electronic devices that converts electromagnetic radiation into electric current. According to some examples, the energy or intensity of the electric current is proportional to the energy or intensity of the electromagnetic radiation received by the photoconductor 116. In one example, the photoconductor is a photodiode, or other similar semiconductor device, made of a semiconductor material, such as one or more of silicon, germanium, indium gallium arsenide, cadmium sulfide, selenium, lead salts, polyvinylcarbazoles. When photons from the electromagnetic radiation are received by the photoconductor 116, a proportional number of electrons move from the anode terminal to the cathode terminal, thereby creating an electric current through the photoconductor 116 such that the photoconductor 116 closes an electric circuit to the deposition electrode 102. However, when photons, from electromagnetic radiation, are not received by the photoconductor 116, no electric current flows from the anode terminal to the cathode terminal such that the photoconductor 116 opens the electric circuit to the deposition electrode 102.

The printhead 110 further includes an electrically conductive layer 104. The electrically conductive layer 104 is electrically coupled with the photoconductors 116 of the photoconductor array 115. Moreover, the electrically conductive layer 104 is positioned on the printhead 110 so that the each one of the photoconductors 116 is electrically interposed between the corresponding one of the deposition electrode 102 and the electrically conductive layer 104. As defined herein, a photoconductor 116 is electrically interposed between a deposition electrode 102 and an electrically conductive layer 104 when the photoconductor 116, the deposition electrode 102, and the electrically conductive layer 104 are electrically coupled together so that an electric current is capable of flowing, at least indirectly (e.g., intervening electrical devices or components may be present) from the electrically conductive layer 104 to the photoconductor 116, and from the photoconductor 116 to the deposition electrode 102. According to some example, intervening electrical components include one or more storage capacitors electrically interposed between the deposition electrodes 102 and the photoconductors 116. The storage capacitor is configured to store energy so that electric current may be supplied to the deposition electrode 102 after the electromagnetic-radiation emitter 108 stops generating the electromagnetic radiation 140 and after the photoconductor 116 is deactivated. Examples of a storage capacitor are disclosed in U.S. patent application Ser. No. 17/566,546, filed Dec. 30, 2021, which is incorporated herein by reference in its entirety.

In certain examples, the electrically conductive layer 104 is in electrical contact with the cathode terminals of the photoconductors 116. As shown in FIGS. 2-12, the electrically conductive layer 104 is supplied with a source of electrical energy at a predetermined constant voltage Vo. Although the source of electrical energy at the predetermined constant voltage Vo is shown as a single input on one side of the printhead 119, in some examples, the source of electrical energy at the predetermined constant voltage Vo can be supplied via multiple inputs on multiple sides of the printhead 119 (e.g., such as when the electrically conductive layer 104 is not a single continuous sheet, but a mesh of segmented and isolated portions or traces (see, e.g., FIGS. 4 and 9)). In some examples, the source of the electrical energy is an electric-power source 190 of the system, and the supply of the electrical energy from the electric-power source 190 to the electrically conductive layer 104 is controlled by a controller 122, via an electric-power supply circuit 141.

In some examples, the electrically conductive layer 104 is a single, continuous layer that is electrically coupled with each one of the photoconductors 116. In other examples, the electrically conductive layer 104 includes multiple segments made of an electrically conductive material that are electrically isolated from each other, so that one segment is electrically coupled with only a first one or more of the photoconductors 116 and another segment is electrically coupled with only a second one or more of the photoconductors 116 (see, e.g., FIG. 9).

The printhead 119 additionally includes at least one electromagnetic-radiation emitter 108. The electromagnetic-radiation emitter 108 is configured to generate electromagnetic radiation 140 (see, e.g., FIGS. 2-12). As described below, the electromagnetic radiation 140 can be one of visible light or non-visible light (e.g., radio, infrared, ultraviolet, x-ray, gamma-ray, etc.). In some examples, the electromagnetic radiation 140 forms a beam of electromagnetic radiation 140 Moreover, the electromagnetic-radiation emitter 108 is positioned and oriented so that, when the electromagnetic radiation 140 is generated, at least a portion of the electromagnetic radiation 140 illuminates at least one of the photoconductors 116 of the photoconductor array 115. The electromagnetic-radiation emitter 108 can be any of various types of electromagnetic-radiation emitters that generates any of various types of electromagnetic-radiation to which a corresponding at least one of the photoconductors 116 is sensitive. According to some examples, the electromagnetic-radiation emitter 108 is one or a combination of a light bulb, light-emitting diode (LED), liquid crystal display (LCD), digital light processing (DLP) display, organic LED (OLED) display, laser, and the like. Various examples of some of these types of electromagnetic-radiation emitters useful in the electrochemical-deposition apparatus 100 are described in more detail. In some examples, the printhead 119 includes different types of electromagnetic-radiation emitters for generating different types of electromagnetic-radiation, and different configurations of photoconductors with sensitivity to the different types of electromagnetic radiation.

In some examples, the electrode array 113, the photoconductor array 115, the electrically conductive layer 104, and/or the electromagnetic-radiation emitter 108 are stationary relative to each other, so that as the printhead moves 119 so do the electrode array 113, the photoconductor array 115, the electrically conductive layer 104, and/or the electromagnetic-radiation emitter 108.

The electrochemical-deposition system 200 further includes a target electrode 164 and an electrolytic solution 222, which can be contained within a partially enclosed container (not shown). In some examples, the electrolytic solution 222 includes one or more of, but not limited to, plating baths, associated with copper, nickel, tin, silver, gold, lead, etc., and which are typically comprised of water, an acid (such as sulfuric acid), metallic salt, and additives (such as levelers, suppressors, surfactants, accelerators, grain refiners, and pH buffers).

In some examples, the electrochemical-deposition system 200 further includes the electric-power supply circuit 141, which, under the control of the controller, regulates the amount of electric current flowing to each one of the deposition electrodes 102 of the electrode array 113 by regulating the characteristics of the electromagnetic radiation 140 generated by the at least one electromagnetic-radiation emitter 108. The electric current, supplied to the deposition electrodes 102, is provided by the electric-power supply circuit 141, which routes power from an electric-power source 190 of the electrochemical-deposition system 200 to the at least one electromagnetic-radiation emitter 108. Although not shown, in some examples, the printhead 119 also includes features, such as insulation layers, that help protect other features of the printhead 119 from the electrolytic solution 222.

The electrochemical-deposition system 200 is configured to move the printhead 119 relative to the electrolytic solution 222, or to move the electrolytic solution 222 relative to the printhead 119, such that the deposition electrodes 102 of the electrode array 113 are at least partially submerged in the electrolytic solution 222. When at least partially submerged in the electrolytic solution 222, and when electric power is supplied to at least one of the deposition electrodes 102, an electrical path (or current) is formed through the electrolytic solution 222 from the at least one of the deposition electrodes 102 to a conductive surface 131 of the target electrode 164. In such an example, the target electrode 164 functions as a cathode and the at least one of the deposition electrodes 102 functions as an anode of the electrochemical-deposition apparatus 100. In response to the electrical path (or current) in the electrolytic solution 222, a layer of material 130 is deposited on the conductive surface 131 of the target electrode 164 at locations corresponding to the locations of the at least one of the deposition electrodes 102. The material 130, which can be one or more layers of metal, formed by supplying electric current to multiple ones of the deposition electrodes 102, forms one or more layers or portions of a part or article, in some examples.

The electrochemical-deposition system 200 supplies electric power from the electric-power source 190 to at least one of the deposition electrodes via selective operation of the electric-power supply circuit 141 by the controller 122. The electric-power supply circuit 141 is configured to supply electric power, at the predetermined constant voltage Vo, from the electric-power source 190 to the electrically conductive layer 104. In certain examples, during operation of the electrochemical-deposition system 200, the supply of the electric power to the electrically conductive layer 104 is constant or continuous. In other words, in certain examples, independent of the activation or deactivation of the electromagnetic-radiation emitter 108, electric power is continuously applied to the electrically conductive layer 104, so that the electrically conductive layer 104 is effectively always "ON". The electric-power supply circuit 141 is also configured to supply electric power from the electric-power source 190 to one or more electromagnetic-radiation emitters 108. In response to receipt of the electric power, the electromagnetic-radiation emitters 108 generate respective amounts (e.g., beams) of electromagnetic radiation 140.

Accordingly, in view of the foregoing, in some examples, the controller 122 is configured to direct the electric power to be supplied from the electric-power source 190 to the electrically conductive layer 104 and to direct the electromagnetic-radiation emitter 108 to generate the electromagnetic radiation 140 at a first radiation level when the electric power is supplied to the electrically conductive layer 104. When the electric power is supplied to the electrically conductive layer 104 and the electromagnetic radiation 140 is generated at the first radiation level, so that at least a portion of the electromagnetic radiation 140 illuminates the photoconductor 116 to activate the photoconductor 116, electric current, at a first level or intensity corresponding with the first radiation level of the electromagnetic radiation 140, is established through the photoconductor 116, the deposition electrode 102, the electrolytic solution 222, and the target electrode 164, and a layer of the material 130 is deposited on the conductive surface 131 of the target electrode 164. In some examples, when the electric power is supplied to the electrically conductive layer 104, the electromagnetic radiation 140 can be generated at a second radiation level, different than the first radiation level, so that at least a portion of the electromagnetic radiation 140 illuminates the photoconductor 116 to activate the photoconductor 116, electric current, at a second level or intensity, different than the first level or intensity and corresponding with the second radiation level of the electromagnetic radiation 140, is established through the photoconductor 116, the deposition electrode 102, the electrolytic solution 222, and the target electrode 164, and a layer of the material 130 is deposited on the conductive surface 131 of the target electrode 164. The quantity of the material 130 deposited on the target electrode 164, via the electric current at the first level, can be different than the quantity of the material 130 deposited on the target electrode 164, via the electric current at the second level.

When the electromagnetic radiation 140 is not generated, even when the electric power is supplied to the electrically conductive layer 104, the photoconductor 116 is not activated and electric current, at a low level or intensity that is significantly lower than the first or second levels or intensities, is established through the photoconductor 116 and the deposition electrode 102, or no electric current is established through the photoconductor 116 and the deposition electrode 102, so that no material is deposited on the conductive surface 131 of the target electrode 164 at the location of the deposition electrode 102.

Figure 2:
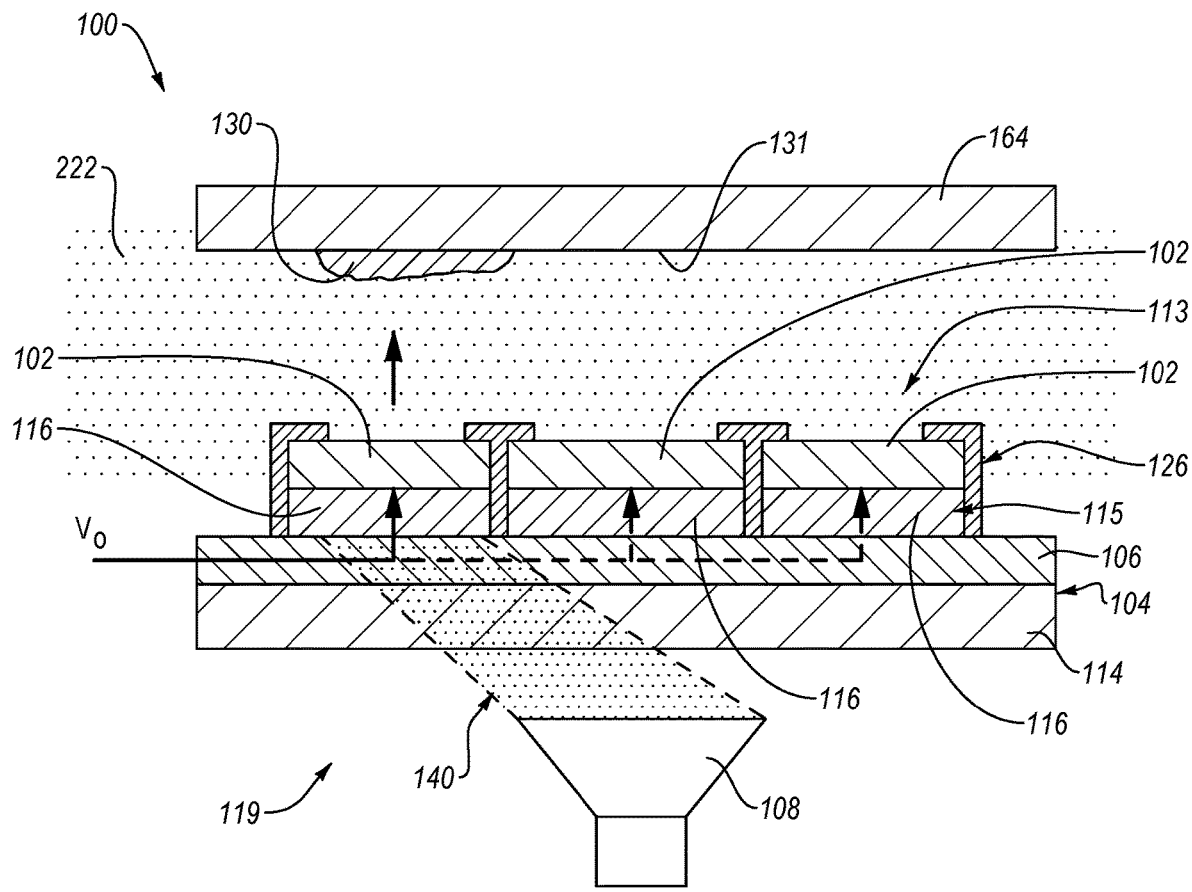
FIG. 2 is a schematic, side elevation, sectional view of an electrochemical-deposition apparatus of the system of FIG. 1, according to one or more examples of the present disclosure.

Multiple layers, in a stacked formation, at a given location on the target electrode 164 can be formed by incrementally moving the printhead 119 away from the target electrode 164 and consecutively supplying an electric current to the one of the deposition electrodes 102 corresponding with that location. The material 130 can have an intricate and detailed shape by modifying or alternating the current, flowing through the deposition electrodes 102. For example, as shown in FIG. 2, first ones of the deposition electrodes 102 are energized, so that the material 130 is being deposited near these "energized" ones of the deposition electrodes 102, when a second one of the deposition electrodes 102 are not energized, so that the material 130 is not being deposited near this "non-energized" one of the deposition electrodes 102.

In some examples, the electrochemical-deposition system 200 further includes the controller 122. The printhead 119 is electrically coupled with the controller 122 via the electric-power supply circuit 141. More specifically, the controller 122 can transmit electrical signals to the electric-power supply circuit 141, and, in response to receipt of the electrical signals from the controller 122, the electric-power supply circuit 141 can selectively turn one or more of the deposition electrodes 102 "ON" or "OFF" (or modify the intensity of electric current flow through the deposition electrodes 102). The controller 122 can be, for example and without limitation, a microcontroller, a microprocessor, a GPU, a FPGA, a SoC, a single-board computer, a laptop, a notebook, a desktop computer, a server, or a network or combination of any of these devices.

According to certain examples, the electrochemical-deposition system 200 additionally includes one or more sensors 123. The controller 122 is electrically coupled with the sensors 123 to receive feedback signals from the sensors 123. The feedback signals include sensed characteristics of the electrochemical-deposition system 200 that enable a determination of the progress of the metal deposition process for forming the material 130. The sensors 123 can be, for example and without limitation, current sensors, voltage sensors, timers, cameras, rangefinders, scales, force sensors, and/or pressure sensors.

One or more of the sensors 123 can be used to measure a distance between the printhead 119 and the target electrode 164. Measuring the distance between the printhead 119 and the target electrode 164 enables "zeroing" of the printhead 119 relative to the target electrode 164 before the material 130 is formed, or setting or confirming the relative position between the printhead 119 and the target electrode 164 before forming each successive metal layer of the material 130. The accurate positioning of the printhead 119 and the target electrode 164 at the initialization of the deposition process can have a significant impact on the success and quality of the completed deposit. In certain examples, any of various types of sensors for determining the distance between the printhead 119 and the target electrode 164 can be used, including, for example and without limitation, mechanical, electrical, or optical sensors, or combinations thereof. In one or more examples, mechanical sensors, such as a pressure sensor, switch, or load cell can be employed. According to some examples, other types of sensors, such as those that detect, for example, capacitance, impedance, magnetic fields, or that utilize the Hall Effect, can be used to determine the location of the printhead 119 relative to the target electrode 164.

Referring to FIG. 1, the electrochemical-deposition system 200 further includes a mounting system 195 and a positioning system 199, which includes a position actuator 124. As shown in the illustrated example, the target electrode 164 is coupled to the position actuator 124, or an additional or alternative position actuator of the positioning system 199, via the mounting system 195. The mounting system 195 is configured to retain the target electrode 164 and to enable the target electrode 164 to be positioned in close proximity to the deposition electrodes 102 of the printhead 119. Actuation of the position actuator 124 moves the mounting system 195 and the target electrode 164 relative to the printhead 119 (and thus relative to the deposition electrodes 102). However, in other examples, the printhead 119, rather than the target electrode 164, is coupled to the position actuator 124 such that actuation of the position actuator 124 moves the printhead 119 relative to the target electrode 164. In yet other examples, both the target electrode 164 and the printhead 119 are coupled to the position actuator 124, such that actuation of the position actuator 124 results in one of the target electrode 164 or the printhead 119 moving relative to the other, or both moving relative to each other.

The position actuator 124 can be a single actuator or multiple actuators that collectively form the position actuator 124. In certain examples, the position actuator 124 controls movement of the target electrode 164 relative to the printhead 119, so that the target electrode 164 can be moved toward or away from the printhead 119, as successive layers of material 130 are built on the target electrode 164. Alternatively, or additionally, in some examples, the position actuator 124 controls movement of the printhead 119 relative to the target electrode 164, so that the printhead 119 can be moved toward or away from the target electrode 164, as successive layers of the material 130 are built. In one or more examples, the position actuator 124 also moves the target electrode 164 relative to the printhead 119, moves the printhead 119 relative to the target electrode 164, or moves both the target electrode 164 relative to the printhead 119 and the printhead 119 relative to the target electrode 164 so that the printhead 119 and the target electrode 164 can be moved relative to each other along respective parallel planes, which can help when forming parts that have a footprint larger than the footprint of the electrode array 113.

Although not shown with particularity in FIG. 1, in one or more examples, the electrochemical-deposition system 200 includes a fluid-handling system. The fluid-handling system can include, for example, a tank, a particulate filter, chemically resistant tubing, and a pump. The electrochemical-deposition system 200 can further include analytical equipment that enables continuous characterization of bath pH, temperature, and ion concentration of the electrolytic solution 222 using methods such as conductivity, high-performance liquid chromatography, mass spectrometry, cyclic voltammetry stripping, spectrophotometer measurements, or the like. Bath conditions of the electrolytic solution 222 can be maintained with a chiller, heater, and/or an automated replenishment system to replace solution lost to evaporation and/or ions of deposited material.

Although the electrochemical-deposition system 200, shown in FIG. 1, has a single printhead with a single electrode array, in one or more alternative examples, the electrochemical-deposition system 200 comprises multiple printheads, each with one or more electrode arrays, or a single printhead with multiple electrode arrays. In one or more examples, these multiple electrode arrays operate simultaneously in different chambers, filled with the same or different electrolytic solutions, or are arranged so that the electrode arrays work together to deposit material on a shared target electrode or series of target electrodes.

Referring to FIG. 2, according to one example, the electrically conductive layer 104 is interposed between the electromagnetic-radiation emitter 108 and the photoconductor 116, so that, when the electromagnetic radiation 140 is generated, at least a portion of the electromagnetic radiation 140 reaches the electrically conductive layer 104 before reaching the photoconductor 116. In such an example, the electromagnetic radiation 140 passes through the electrically conductive layer 104 before illuminating (e.g., impacting) the photoconductor 116. The electrically conductive layer 104 can be at least partially transparent to the electromagnetic radiation 140. For example, as shown in FIG. 2, in certain examples, the electrically conductive layer 104 includes an electrically conductive material 106, such as semiconducting oxides of tin, indium, zinc, and cadmium, and metals (e.g., silver, gold, and titanium nitride), that is at least partially transparent to the electromagnetic radiation 140. In one example, the electromagnetic radiation 140 is a light (e.g., visible light or non-visible light) and the electrically conductive material 106 is transparent to the light. The electrically conductive material 106 is in electrical contact with the cathode terminals of the photoconductors 116.

According to some examples, the electrically conductive layer 104 has multiple layers or sub-layers. In the examples shown in FIGS. 2-9, the electrically conductive layer 104 includes the electrically conductive material 106 and an electrically non-conductive substrate 114. The electrically conductive layer 104 is coupled with (e.g., applied onto, deposited onto, adhered to, etc.) the non-conductive substrate 114. The non-conductive substrate 114 promotes rigidity of the electrically conductive layer 104, electrically isolates the electrically conductive material 106, and supports the electrically conductive material 106. According to certain examples, as shown in FIG. 2, the electrically non-conductive substrate 114 is interposed between the electrically conductive material 106 and the electromagnetic-radiation emitter 108 so that, when generated, the electromagnetic radiation 140 passes through the electrically non-conductive substrate 114 before passing through the electrically conductive material 106 and illuminating the photoconductor 116. In some examples, the electrically non-conductive substrate 114 is made of an electrically non-conductive material, such as a polymer, glass, acrylic, and the like, that is at least partially transparent (fully transparent, in some examples) to the electromagnetic radiation 140.

Referring to FIG. 2, and according to one example of the electrochemical-deposition apparatus 100, three deposition electrodes 102 of the electrode array 113 and three photoconductors 116 of the photoconductor array 115 are shown. The electrically conductive material 106 of the electrically conductive layer 104 is in electrical contact with each one of the three photoconductors 116 and is receiving electric power at the predetermined constant voltage Vo. When the electrically conductive material 106 is a single, continuous layer, in certain examples, the electrically conductive material 106 forms a sheet.

The controller 122 controls the electromagnetic-radiation emitter 108 to generate the electromagnetic radiation 140. At least a portion of the electromagnetic radiation 140 passes through the electrically non-conductive substrate 114 and the electrically conductive material 106 before illuminating one of the three photoconductors 116. The intensity of the electromagnetic radiation 140 is sufficient to activate the photoconductor 116, which effectively changes the photoconductor 116 from an electrically non-conducting state to an electrically conducting state, which permits electric current, from the electrically conductive material 106, to flow to the one of the three deposition electrodes 102 and through the electrolytic solution 222, as indicated by a solid directional arrow. The electric current flowing through electrolytic solution 222 results in the deposition of the material 130 onto the target electrode 164. Because the electromagnetic radiation 140 does not illuminate the second or third ones of the three photoconductors 116, the second and third ones of the photoconductors 116 remain in a deactivated or electrically non-conducting state, so that no electric current or a reduced level of electric current flows through the third deposition electrode 102, as indicated by a dashed directional arrow, and no material is deposited onto the target electrode 164 at the location of the second and third ones of the deposition electrodes 102.

Figure 3:
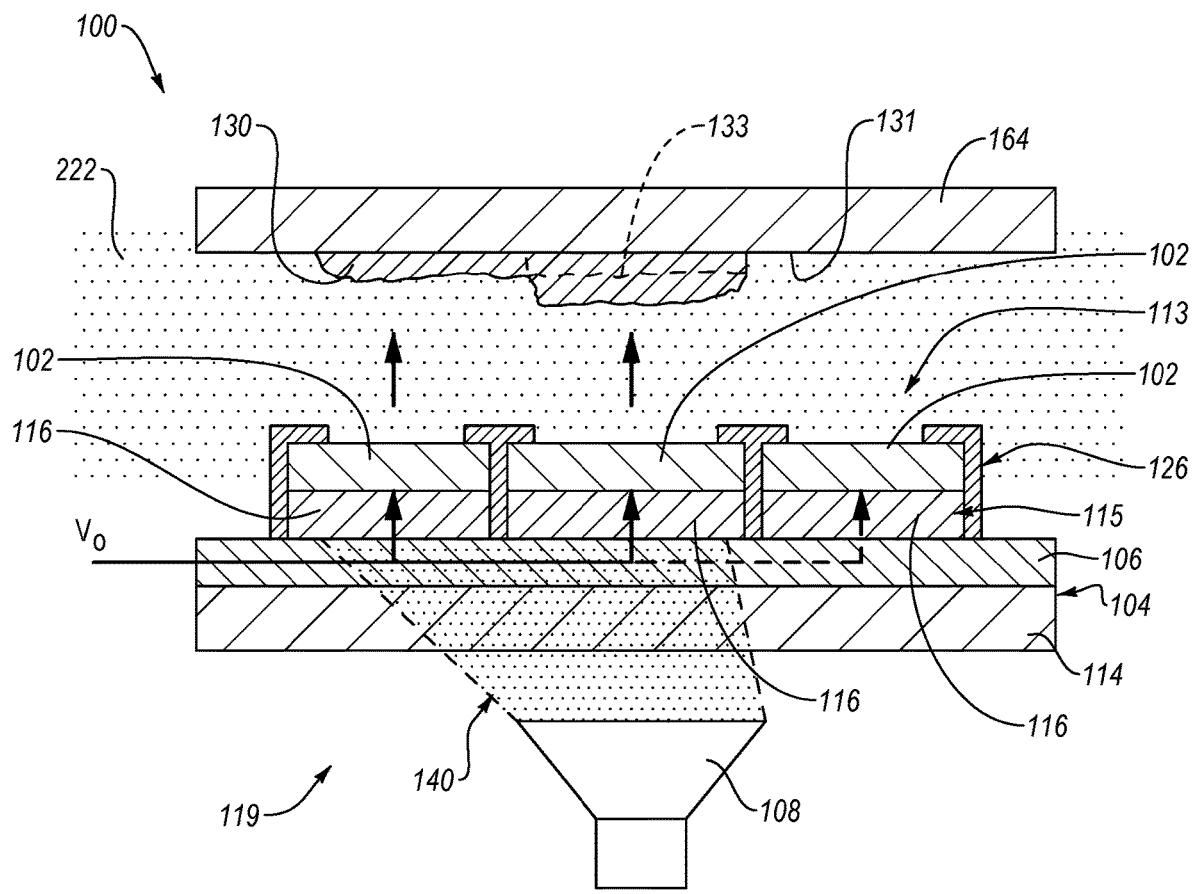
FIG. 3 is a schematic, side elevation, sectional view of an electrochemical-deposition apparatus of the system of FIG. 1, according to one or more examples of the present disclosure.

Referring to FIG. 3, according to another example of the electrochemical-deposition apparatus 100, three deposition electrodes 102 of the electrode array 113 and three photoconductors 116 of the photoconductor array 115 are shown. Like the electrochemical-deposition apparatus 100 of FIG. 2, the electromagnetic-radiation emitter 108 generates the electromagnetic radiation 140. However, unlike the electrochemical-deposition apparatus 100 of FIG. 2, the electromagnetic radiation 140 is configured to pass through the electrically non-conductive substrate 114 and the electrically conductive material 106 before illuminating more than one (e.g., two) of the three photoconductors 116. The intensity of the electromagnetic radiation 140 is sufficient to activate at least two of the photoconductors 116 illuminated by the electromagnetic radiation 140, which permits electric current from the electrically conductive material 106 to flow to the corresponding deposition electrodes 102 and through the electrolytic solution 222, as indicated by solid directional arrows, so that the material 130 is deposited onto the target electrode 164 at the location of the corresponding deposition electrode 102. Because the electromagnetic radiation 140 does not illuminate one of the three photoconductors 116, this photoconductor 116 is not activated, such that no electric current or a significantly reduced level of electric current flows through it, as indicated by a dashed directional arrow, and no material is deposited onto the target electrode 164 at the location of this deposition electrode 102.

In the illustrated example of FIG. 3, the material 130 deposited at the location of a first one of the deposition electrodes 102 (e.g., a left one of the deposition electrodes 102) is an initial layer of material deposited onto the conductive surface 131 of the target electrode 164, and the material 130 deposited at the location of a second one of the deposition electrodes 102 (e.g., a middle one of the deposition electrodes 102) is a subsequent layer of material applied onto a previously deposited layer 133 of material, indicated by dashed lines. Although not shown in FIG. 3, the material 130 deposited by the first one of the deposition electrodes 102 could also be deposited onto a previously deposited layer and/or the material 130 deposited by the second one of the deposition electrodes 102 could be an initial layer of material deposited onto the conductive surface 131.

In some examples, the electrochemical-deposition apparatuses 100 of FIGS. 2 and 3 are the same. In other words, in some examples, the electromagnetic-radiation emitter 108 is selectively adjustable to adjust the coverage, orientation, position, and/or the intensity of the electromagnetic radiation 140, so that a different one or ones of the photoconductors 116 are illuminated and activated. For example, the coverage of the electromagnetic radiation 140 of FIG. 2 is narrowed (e.g., smaller beam angle) relative to the electromagnetic radiation 140 of FIG. 3, so that fewer of the photoconductors 116 in FIG. 2 are activated.

Figure 4:
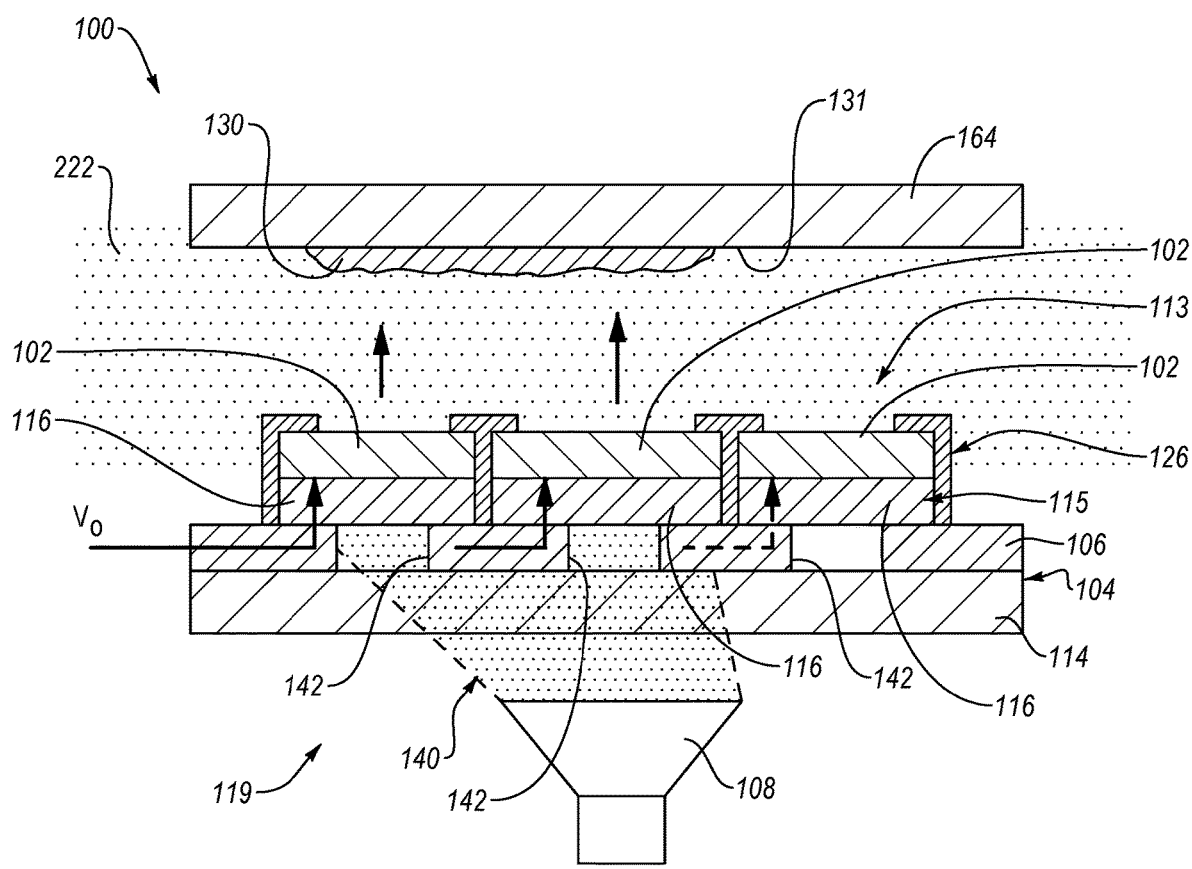
FIG. 4 is a schematic, side elevation, sectional view of an electrochemical-deposition apparatus of the system of FIG. 1, according to one or more examples of the present disclosure.

Referring to FIG. 4, according to another example of the electrochemical-deposition apparatus 100, three deposition electrodes 102 of the electrode array 113 and three photoconductors 116 of the photoconductor array 115 are shown. Like the electrochemical-deposition apparatus 100 of FIG. 2, the electromagnetic-radiation emitter 108 generates electromagnetic radiation 140 that illuminates two of the three deposition electrodes 102. However, unlike the electrochemical-deposition apparatus 100 of FIG. 2, the electrically conductive material 106 includes material that is not transparent to the electromagnetic radiation 140. Instead, the electrically conductive material 106 includes apertures 142 that are spaced-apart from each other and positioned in alignment corresponding ones of the photoconductors 116. The electromagnetic radiation 140 is thus passable through the electrically conductive material 106 via one or more of the apertures 142. Accordingly, when the electromagnetic radiation 140 is directed towards the electrically conductive material 106, only the portion of the electromagnetic radiation 140 passing through the apertures 142 illuminates the photoconductors 116. In this manner, the photoconductors 116 that are illuminated by electromagnetic radiation 140 can be more precisely controlled without precisely controlling the coverage of the electromagnetic radiation 140. In some examples, the electrically conductive material 106 is a single continuous part and the apertures 142 are circumferentially closed through-holes formed in the part. However, in other examples, the electrically conductive material 106 includes multiple spaced-apart segments or traces of a mesh, where the segments are electrically isolated from each other and each receives electric energy independently of each other, and the apertures 142 are defined as the gaps between adjacent ones of the multiple spaced-apart segments or traces.

Figure 5:
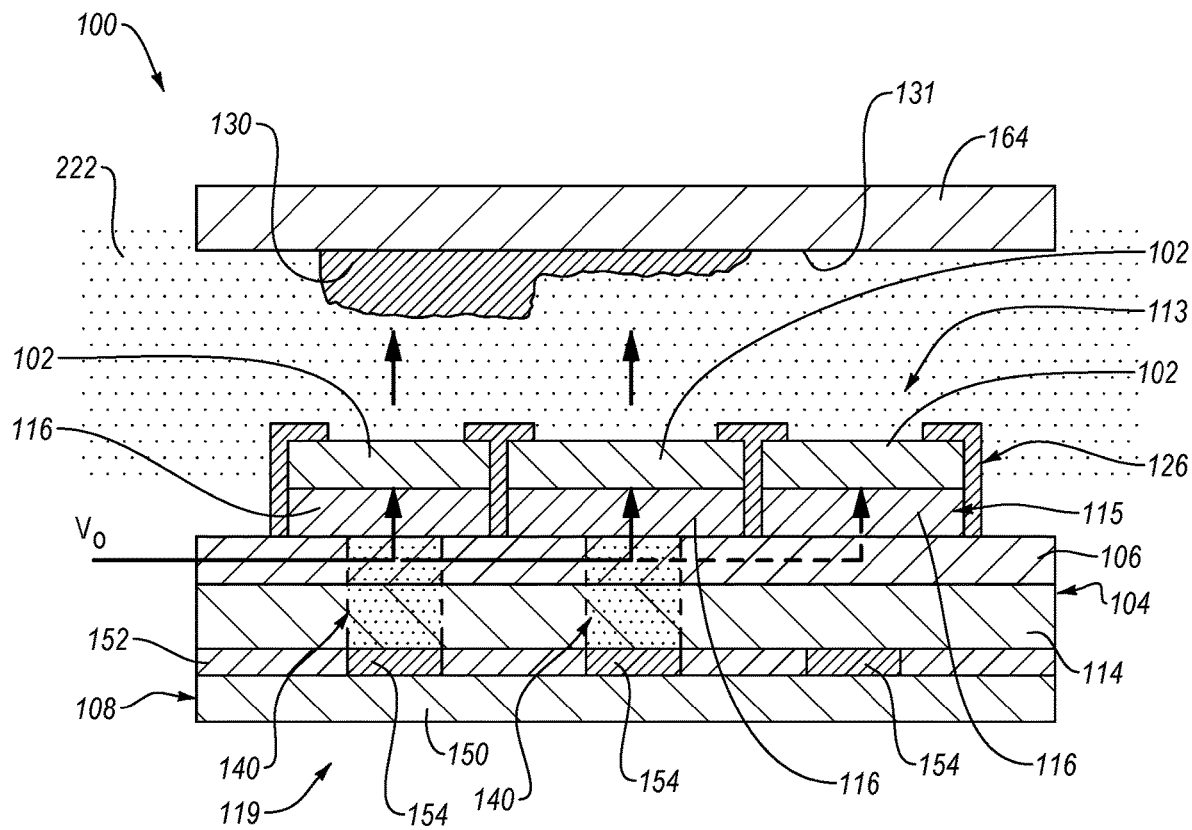
FIG. 5 is a schematic, side elevation, sectional view of an electrochemical-deposition apparatus of the system of FIG. 1, according to one or more examples of the present disclosure.

Referring to FIG. 5, according to another example of the electrochemical-deposition apparatus 100, three deposition electrodes 102 of the electrode array 113 and three photoconductors 116 of the photoconductor array 115 are shown. The electromagnetic-radiation emitter 108 of FIG. 5 includes a display panel 152 and a backlight source 150. The display panel 152 includes a plurality of electromagnetic-radiation-generating elements, which, in the example of FIG. 5, include a plurality of liquid crystal elements 154. Each one of the liquid crystal elements 154 includes a liquid crystal material that is selectively activatable to permit light to pass through. The display panel 152 includes electronic circuitry that enables selective activation and deactivation of the liquid crystal elements 154.

According to the example of FIG. 5, each one of the liquid crystal elements 154 is selectively activated, so that light generated by the backlight source 150 passes through the liquid crystal element 154. In contrast, each one of the liquid crystal elements 154 is selectively deactivated, so that light, generated by the backlight source 150, does not pass through the liquid crystal element 154. The backlight source 150 can include any number of light generating devices, such as light-emitting diodes (LED), lightbulbs, and the like.

As shown in FIG. 5, when a liquid crystal element 154 is activated, the light passing through the element illuminates a corresponding one of the photoconductors 116 so the photoconductor 116 is activated to enable the passage of electric current to the corresponding one of the deposition electrodes 102. The liquid crystal element 154 associated with two of the three photoconductors 116 is activated, as indicated by solid directional arrows, and the liquid crystal element 154 associated with a third of the three photoconductors 116 is deactivated, as indicated by a dashed directional arrow.

In some examples of the electrochemical-deposition apparatus 100 of FIG. 5, the transparency of the liquid crystal elements 154 is adjustable to adjust the intensity of the light passed therethrough. Moreover, the electric current passed through the photoconductors 116 can vary based on the intensity of the light received by the photoconductors 116. In this manner, the magnitude of the electric current passing through the deposition electrode 102, the electrolytic solution 222, and the target electrode 164 can be adjusted by adjusting the intensity of the light received by the photoconductors 116. Because the quantity of the material 130 deposited onto the target electrode 164 is proportional to the magnitude of the electric current passing through the deposition electrode 102, the electrolytic solution 222, and the target electrode 164, adjusting the intensity of the light received at the photoconductors 116 can adjust the quantity of the material 130 deposited onto the target electrode 164 at locations corresponding with the deposition electrode 102. Accordingly, the rate or quantity of the material 130 deposited onto the target electrode 164 can vary by controlling the transparency of the liquid crystal elements 154. Additionally, the rate or quantity of the material 130 deposited onto the target electrode 164 can vary from location to location by selectively controlling the transparency of one of the liquid crystal elements 154 relative to another one of the liquid crystal elements 154.

Analogous to varying the intensity of the electromagnetic radiation by varying the transparency of the liquid crystal elements 154, in some examples, the intensity of the electromagnetic radiation generated by other types of electromagnetic-radiation emitters described herein can be varied to change the rate or quantity of the material 130 deposited onto the target electrode 164. Moreover, in the examples having multiple electromagnetic-radiation emitters or multiple electromagnetic-radiation-generating elements, the intensity of the electromagnetic radiation generated by one of the multiple electromagnetic-radiation emitters or multiple electromagnetic-radiation-generating elements can be adjusted to be different than the intensity of the electromagnetic radiation generated by at least another one of the multiple electromagnetic-radiation emitters or multiple electromagnetic-radiation-generating elements, so that the rate or quantity of the material 130 deposited at one location on the target electrode 164 is different than at another location or locations on the target electrode 164.

Figure 6:
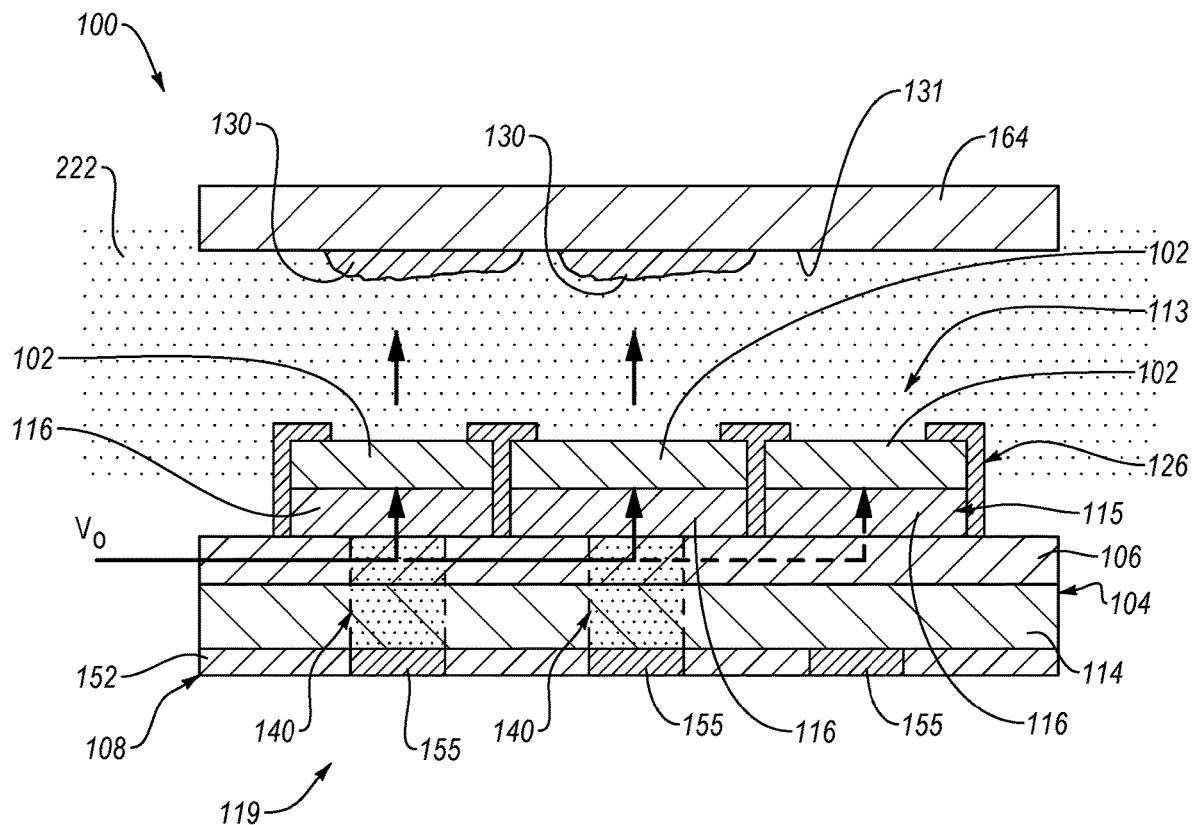
FIG. 6 is a schematic, side elevation, sectional view of an electrochemical-deposition apparatus of the system of FIG. 1, according to one or more examples of the present disclosure.

Referring to FIG. 6, according to another example of the electrochemical-deposition apparatus 100, three deposition electrodes 102 of the electrode array 113 and three photoconductors 116 of the photoconductor array 115 are shown. The electromagnetic-radiation emitter 108 of FIG. 6 includes a display panel 152 having a plurality of electromagnetic-radiation-generating elements. In the example shown in FIG. 6, each one of the electromagnetic-radiation-generating elements is a self-illuminating light source 155, such as an LED, an organic light-emitting diode (OLED), a plasma cell, and the like, which is selectively activatable to generate electromagnetic radiation 140. The display panel 152 includes electronic circuitry that enables activation and deactivation of the self-illuminating light source 155.

As shown in FIG. 6, when a self-illuminating light source 155 is activated, the light generated by the self-illuminating light source 155 illuminates a corresponding one of the photoconductors 116 so the photoconductor 116 is activated to enable the passage of electric current to the corresponding one of the deposition electrodes 102. The self-illuminating light source 155 associated with two of the three photoconductors 116 is activated, as indicated by solid directional arrows, and the self-illuminating light source 155 associated with a third of the three photoconductors 116 is deactivated, as indicated by a dashed directional arrow.

In some examples of the electrochemical-deposition apparatus 100 of FIG. 6, the intensity of the electromagnetic radiation 140 generated by the self-illuminating light sources 155 is adjustable relative to each other. Accordingly, in accordance with the foregoing description, the quantity of the material 130 deposited onto the target electrode 164 can vary by controlling the intensity of the electromagnetic radiation 140 generated by the self-illuminating light sources 155. Additionally, the quantity of the material 130 deposited onto the target electrode 164 can vary from location to location by selectively controlling the intensity of the electromagnetic radiation 140 generated by one of the self-illuminating light sources 155 relative to another one of the self-illuminating light sources 155.

Figure 7:
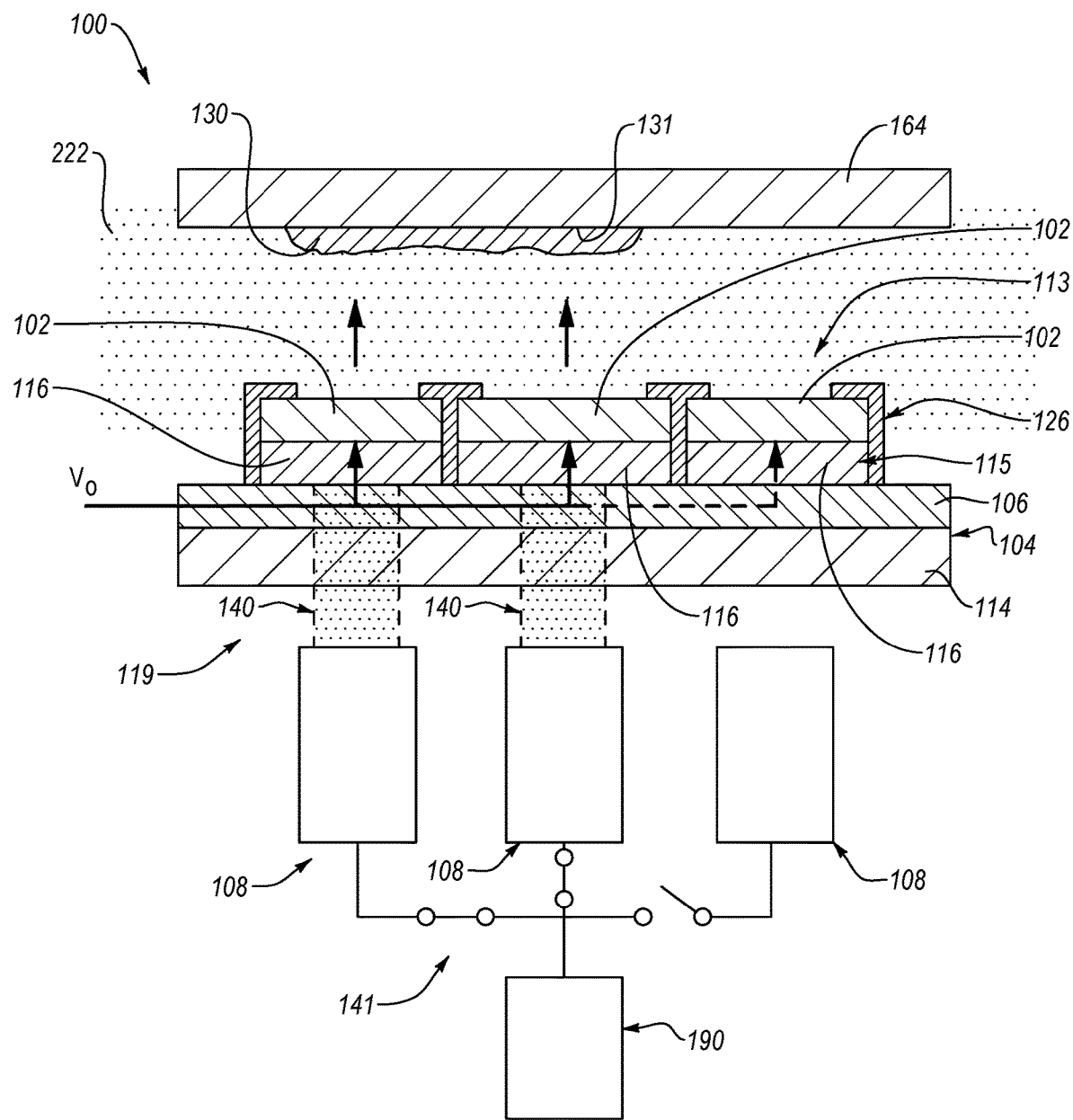
FIG. 7 is a schematic, side elevation, sectional view of an electrochemical-deposition apparatus of the system of FIG. 1, according to one or more examples of the present disclosure.

Referring to FIG. 7, according to some examples of the electrochemical-deposition apparatus 100, three deposition electrodes 102 of the electrode array 113 and three photoconductors 116 of the photoconductor array 115 are shown. The electrochemical-deposition apparatus 100 of FIG. 7 includes multiple electromagnetic-radiation emitters 108 each configured to generate a separate amount (e.g., beam) of electromagnetic radiation 140. In the illustrated embodiment, each one of the electromagnetic-radiation emitters 108 is associated with a corresponding one of the photoconductors 116. In other words, the electromagnetic radiation 140 generated by each one of the each one of the electromagnetic-radiation emitters 108 is configured to illuminate a corresponding one of the photoconductors 116. However, in other examples, each one of the electromagnetic-radiation emitters 108 is associated with a corresponding two or more of the photoconductors 116. According to one example, each one of the electromagnetic-radiation emitters 108 is a laser and each one of the amounts of electromagnetic radiation 140 is a laser beam.

In certain examples, each one of the electromagnetic-radiation emitters 108 is selectively operable independently of any other one of the electromagnetic-radiation emitters 108. The electromagnetic-radiation emitters 108 are electrically coupled with the electric-power source 190 via the electric-power supply circuit 141. The controller 122 is configured to control activation of switches of the electric-power supply circuit 141 to selectively activate one or more of the electromagnetic-radiation emitters 108. It is recognized that the same configuration of the electric-power supply circuit 141 shown in FIG. 7 can be applied to control the multiple electromagnetic-radiation-generating elements of FIGS. 5 and 6.

In some examples of the electrochemical-deposition apparatus 100 having multiple, independently and selectively operable, electromagnetic-radiation emitters 108 or electromagnetic-radiation-generating elements of an electromagnetic-radiation emitter 108, mapping of the electric current being passed through different regions or groupings of deposition electrodes 102 may be performed. The deposition electrodes 102 of the electrode array 113 may be separated into different regions via different voltage busses. The electromagnetic-radiation emitters 108 or electromagnetic-radiation-generating elements associated with the different regions may be individually activated to individually illuminate the photoconductor or photoconductors associated with the different regions. When the photoconductor or photoconductors associated with a region are activated, the electric current passing through the deposition electrodes 120 associated with that region can be measured and mapped.

Figure 8A:
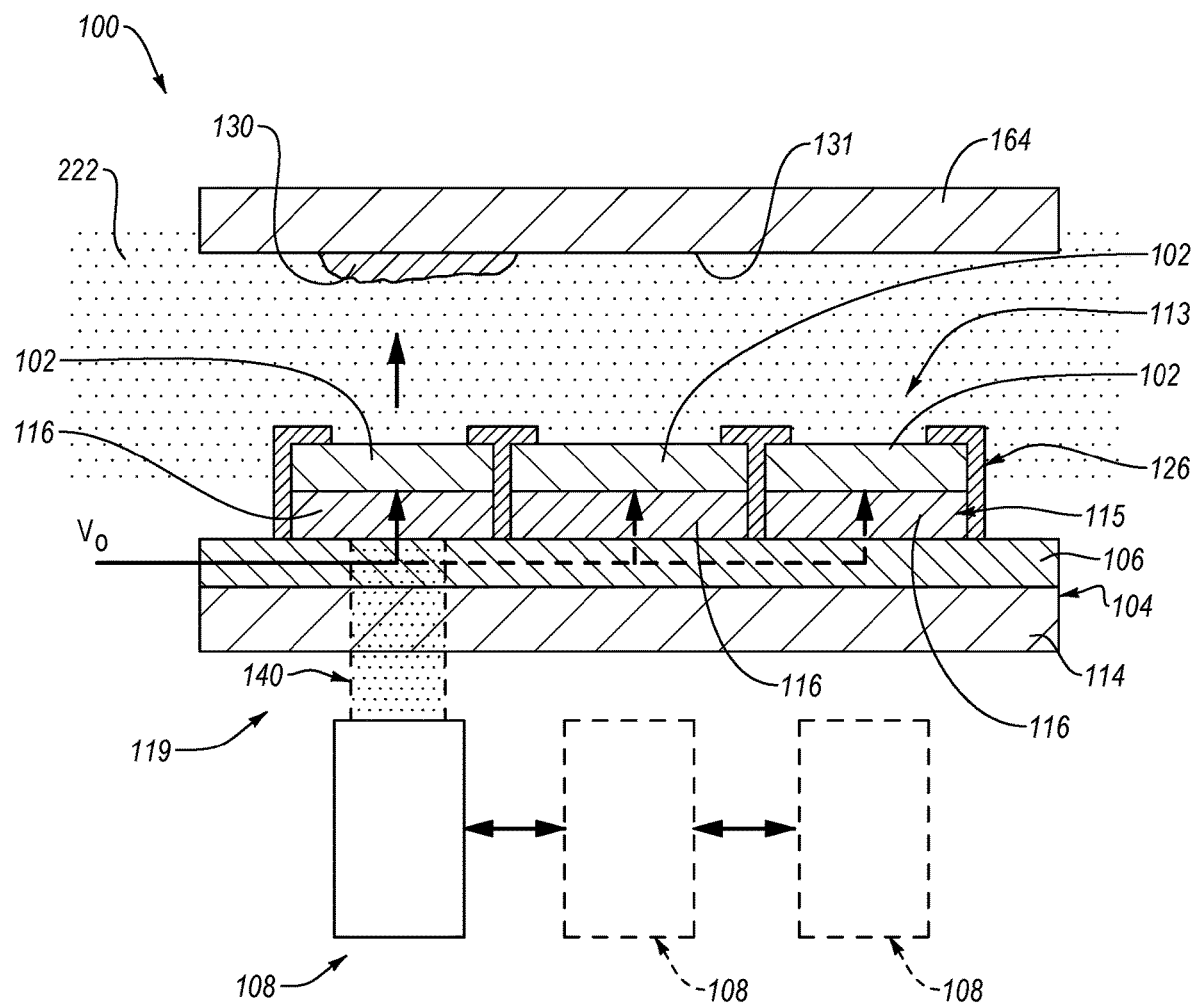
FIG. 8A is a schematic, side elevation, sectional view of an electrochemical-deposition apparatus of the system of FIG. 1, according to one or more examples of the present disclosure.

Referring to FIG. 8A, according to some examples of the electrochemical-deposition apparatus 100, three deposition electrodes 102 of the electrode array 113 and three photoconductors 116 of the photoconductor array 115 are shown. The electrochemical-deposition apparatus 100 of FIG. 8 includes an electromagnetic-radiation emitter 108 that is movable, relative to the photoconductor array 115. More specifically, the electromagnetic-radiation emitter 108 is movable between, and inclusive of, multiple positions each corresponding with one of the photoconductors 116 of the photoconductor array 115. When in a first position, of the multiple positions, the electromagnetic radiation 140 generated by the electromagnetic-radiation emitter 108 illuminates a first one of the photoconductors 116. In contrast, in a second position, of the multiple positions, the electromagnetic radiation 140 generated by the electromagnetic-radiation emitter 108 illuminates a first one of the photoconductors 116. In this manner, the photoconductors 116 can be selectively and separately activated by moving the electromagnetic-radiation emitter 108 from position to position. Although not shown, the electrochemical-deposition apparatus 100 can include a positioning system (e.g., an actuator), controllable by the controller 122, that moves the electromagnetic-radiation emitter 108 between positions. Moreover, although only one electromagnetic-radiation emitter 108 is shown in FIG. 8, in some examples, the electrochemical-deposition apparatus 100 can include multiple electromagnetic-radiation emitters 108 each movable relative to the photoconductor array 115 and relative to the other electromagnetic-radiation emitters 108. Although the electromagnetic-radiation emitter 108 of FIG. 8A is shown to be translationally movable from position to position, in other examples, the electromagnetic-radiation emitter 108 is rotationally movable from position to position (e.g., from orientation to orientation).

Figure 8B:
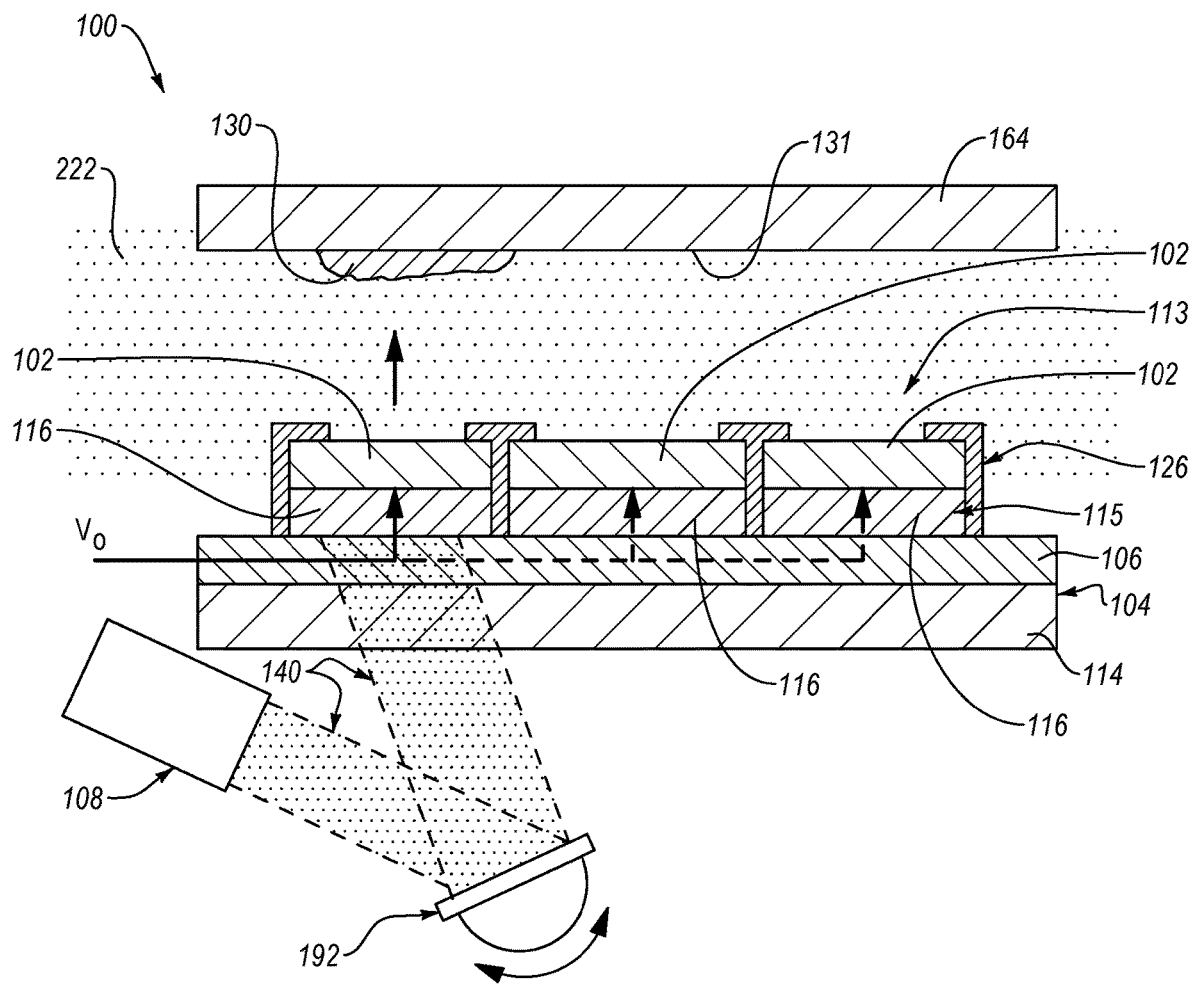
FIG. 8B is a schematic, side elevation, sectional view of an electrochemical-deposition apparatus of the system of FIG. 1, according to one or more examples of the present disclosure.

Referring to FIG. 8B, in some examples, the electrochemical-deposition apparatus 100 includes an adjustable mirror 192, which receives electromagnetic radiation 140 from an electromagnetic-radiation emitter 108. The electromagnetic-radiation emitter 108 is fixed relative to the electrode array 113 and the photoconductor array 115 and is configured to generate and direct the electromagnetic radiation 140 toward the adjustable mirror 192. The adjustable mirror 192 includes a reflective surface that reflects the electromagnetic radiation 140 toward one or more of the photoconductors 116 of the photoconductor array 115. The angle of the reflective surface is adjustable (e.g., rotatable) relative to the electromagnetic-radiation emitter to adjust the direction of the electromagnetic radiation 140 reflected off the reflective surface. In one example, the controller 122 controls the adjustable mirror 192 to direct the electromagnetic radiation 140 to desired one or more of the photoconductors 116, resulting in the deposition of the material 130 onto the target electrode 164 at a location corresponding with the desired one or more of the photoconductors 116. The location at which the material 130 is deposited can be adjusted to a second location by adjusting the adjustable mirror 192 to direct the electromagnetic radiation 140 to another one or more of the photoconductors 116 corresponding with the second location.

Figure 9:
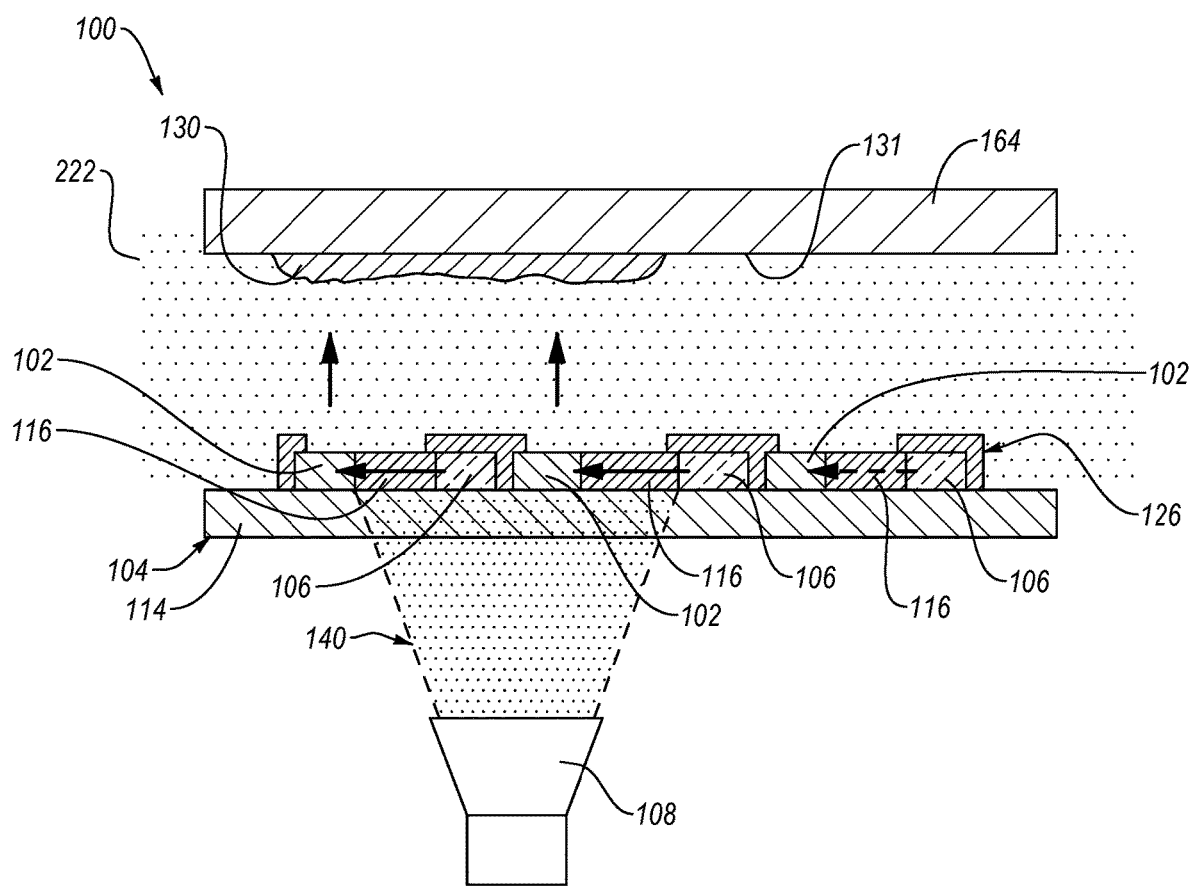
FIG. 9 is a schematic, side elevation, sectional view of an electrochemical-deposition apparatus of the system of FIG. 1, according to one or more examples of the present disclosure.

As shown in FIG. 9, according to some examples of the electrochemical-deposition apparatus 100, the electrically conductive material 106 is not interposed between the electromagnetic-radiation emitter 108 and the photoconductor 116. Instead, in the electrochemical-deposition apparatus 100 of FIG. 9, the electrically conductive material 106, the photoconductor 116, and the deposition electrode 102 are arranged in a side-by-side manner along a plane parallel to the conductive surface 131 of the target electrode. The photoconductor 116 is still electrically interposed between the electrically conductive material 106 and the deposition electrode 102. However, the electromagnetic radiation 140 generated by the electromagnetic-radiation emitter 108 need not pass through the electrically conductive material 106 to illuminate the photoconductor 116, activate the photoconductor 116, and establish an electric current, from the electrically conductive material 106, through the photoconductor 116, and through the deposition electrode 102. The insulation 126 insulates the electrically conductive material 106 so that the electrically conductive material 106 is physically isolated from the electrolytic solution 222 during electrodeposition of the material 130 on the target electrode 164. In some examples, the deposition electrode 102, the photoconductor 116, and the electrically conductive material 106 are supported on an electrically non-conductive substrate 114, which can be at least partially transparent to the electromagnetic radiation 140 in a manner as described above.

Figure 10:
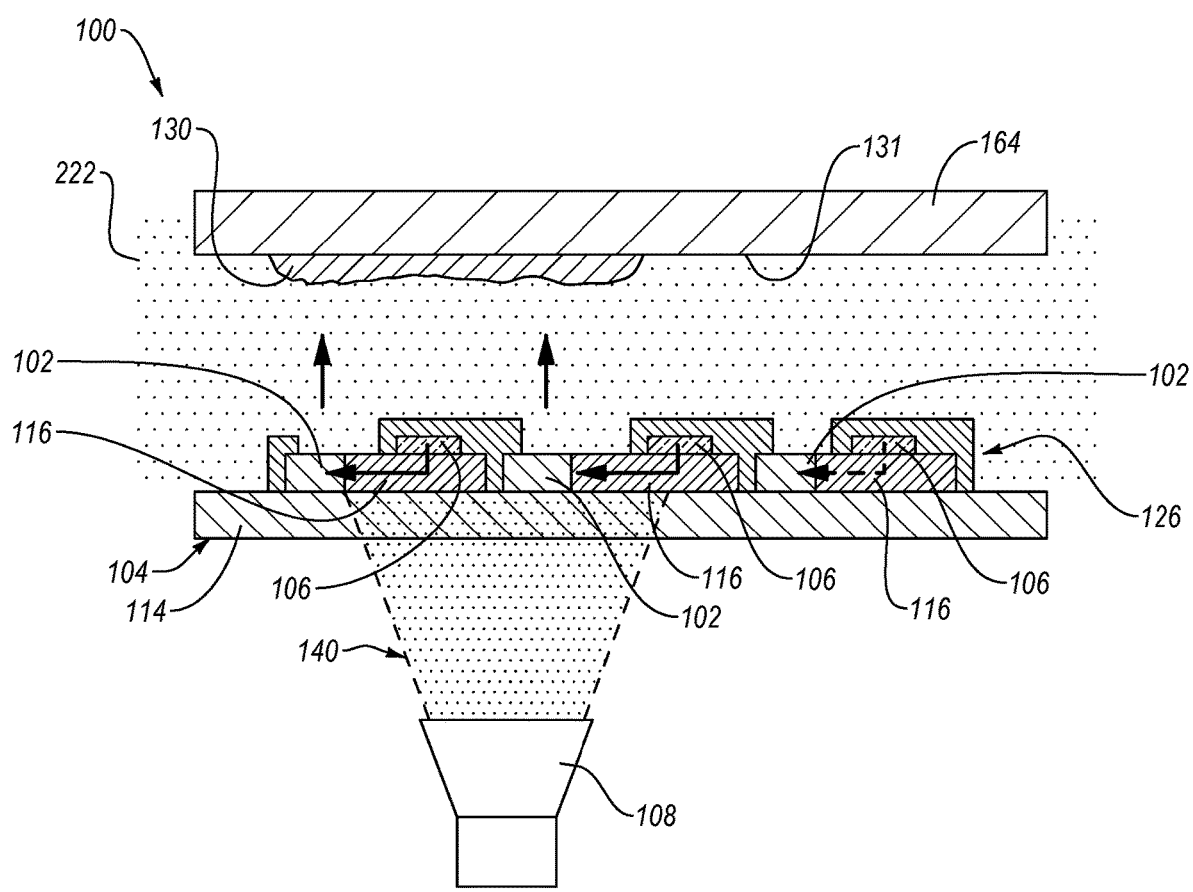
FIG. 10 is a schematic, side elevation, sectional view of an electrochemical-deposition apparatus of the system of FIG. 1, according to one or more examples of the present disclosure.

Referring to FIG. 10, according to another example of the electrochemical-deposition apparatus 100, in which the electrically conductive material 106 is not interposed between the electromagnetic-radiation emitter 108 and the photoconductor 116, the electrically conductive material 106 is arranged such that the electrically conductive material 106 is interposed between the photoconductor 116 and the target electrode 164. Depending on the orientation of the printhead 119, the electrically conductive material 106 can be above the photoconductor 116 (e.g., when the printhead 119 is below the target electrode 164). The insulation 126 insulates the electrically conductive material 106 so that the electrically conductive material 106 is physically isolated from the electrolytic solution 222 during electrodeposition of the material 130 on the target electrode 164. The deposition electrode 102 and the photoconductor 116 may still be arranged in a side-by-side manner along a plane parallel to the conductive surface 131 of the target electrode. The photoconductor 116 is still electrically interposed between the electrically conductive material 106 and the deposition electrode 102. However, like the electrochemical-deposition apparatus 100 of FIG. 9, the electromagnetic radiation 140 generated by the electromagnetic-radiation emitter 108 need not pass through the electrically conductive material 106 to illuminate the photoconductor 116, activate the photoconductor 116, and establish an electric current, from the electrically conductive material 106, through the photoconductor 116, and through the deposition electrode 102.

Figure 11A:
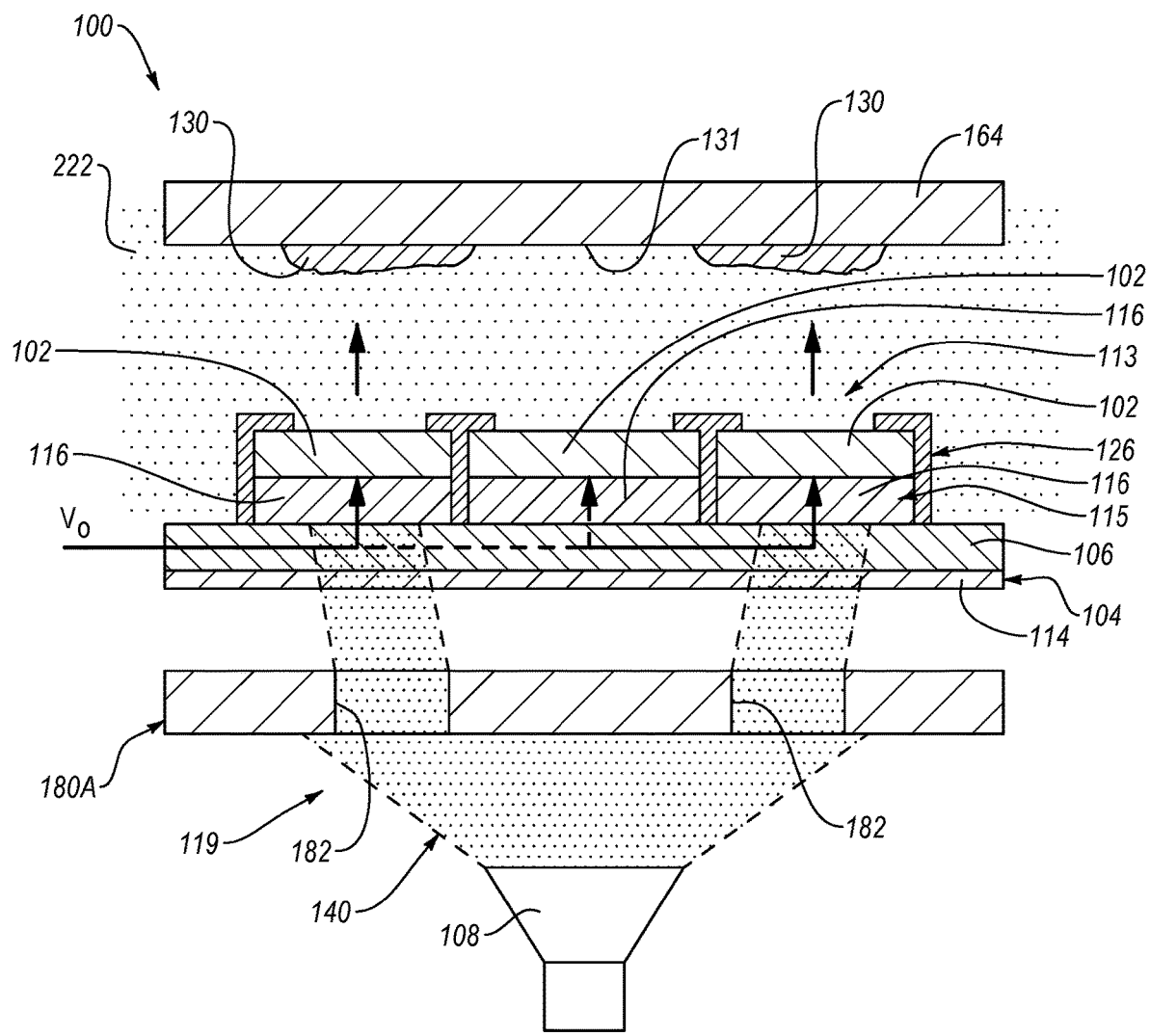
FIG. 11A is a schematic, side elevation, sectional view of an electrochemical-deposition apparatus of the system of FIG. 1, according to one or more examples of the present disclosure.
Figure 11B:
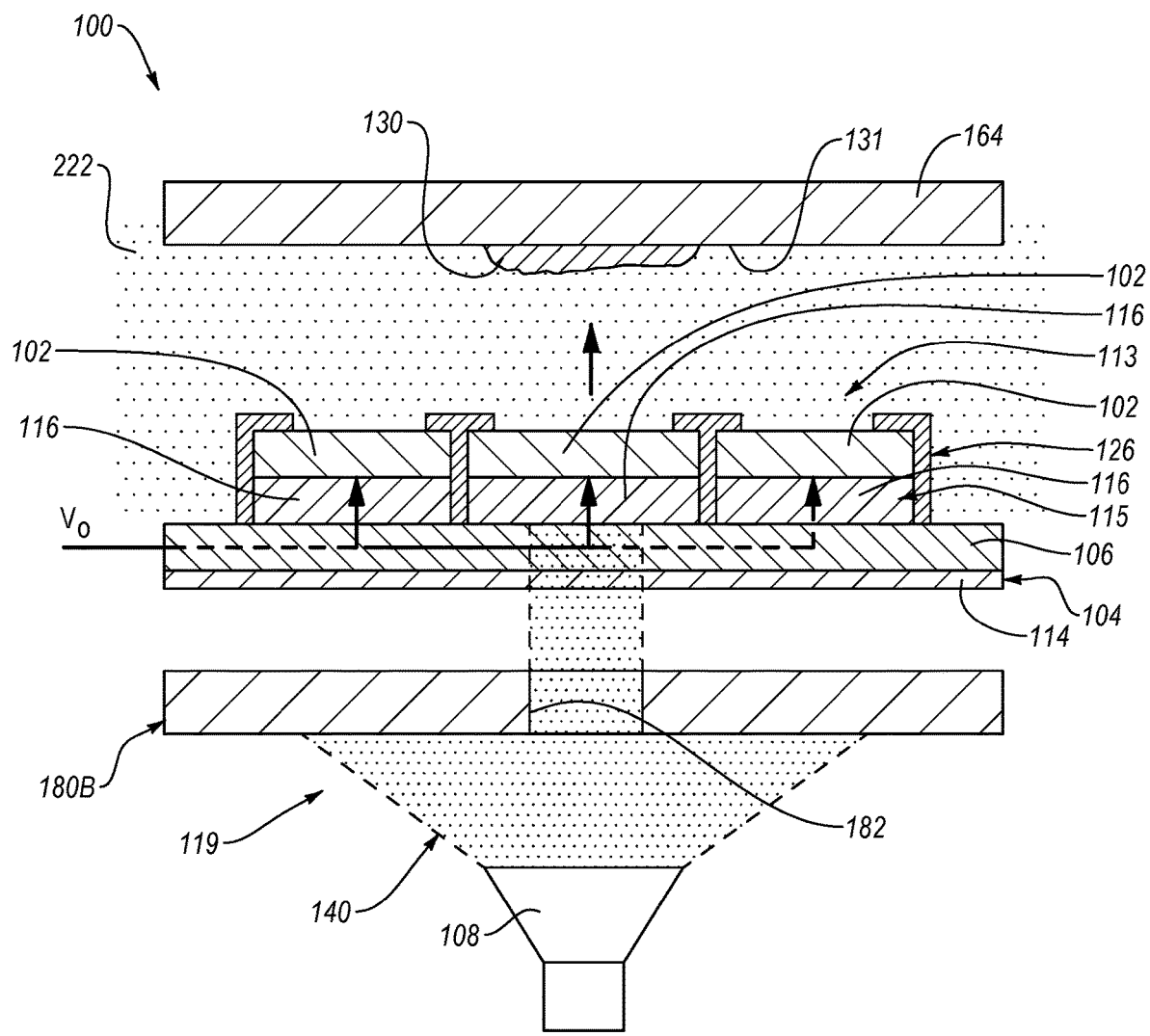
FIG. 11B is a schematic, side elevation, sectional view of an electrochemical-deposition apparatus of the system of FIG. 1, according to one or more examples of the present disclosure.

Referring to FIGS. 11A and 11B, in some examples, the electrochemical-deposition apparatus 100 utilizes a photomask to direct electromagnetic radiation only to a desired one or more photoconductors 116. The photomask includes a portion or portions that block the transmission of the electromagnetic radiation 140 and a portion or portions that permit the transmission of the electromagnetic radiation 140 through the photomask.

As shown in FIG. 11A, a photomask 180A includes two pass-through portions 182, which can be apertures, an at least partially transparent material, etc. in some examples. The pass-through portions 182 permit the electromagnetic radiation 140 generated by the electromagnetic-radiation emitter 108 to pass through the photomask 180A. The photomask 180A is interposed between the photoconductors 116 and the electromagnetic-radiation emitter 108. The position of the photomask 180A relative to the electromagnetic-radiation emitter 108, size of the pass-through portions 182, and location of the pass-through portions 182 on the photomask 180A dictate the intensity and the directionality of the electromagnetic radiation 140 passing through the pass-through portions 182. In this manner, the photomask 180A is configured so that the electromagnetic radiation 140 passing through the pass-through portions 182 illuminates only the photoconductor 116 or the photoconductors 116 that will result in the deposition of material 130 on the target electrode 164 at a desired location, rate, and quantity. In the example of FIG. 11A, the two pass-through portions 182 enable portions of the electromagnetic radiation 140 to illuminate only two of the three photoconductors 116.

In contrast, the photomask 180B has one pass-through portion 182 sized and located so that the portion of the electromagnetic radiation 140 passing through the pass-through portion 182 illuminates only one of the three photoconductors 116. In some examples, the electrochemical-deposition apparatus 100 includes multiple photomasks that are interchangeable or switchable with each other to deposit multiple layers on the target electrode 164, each having a different pattern.

Figure 12:
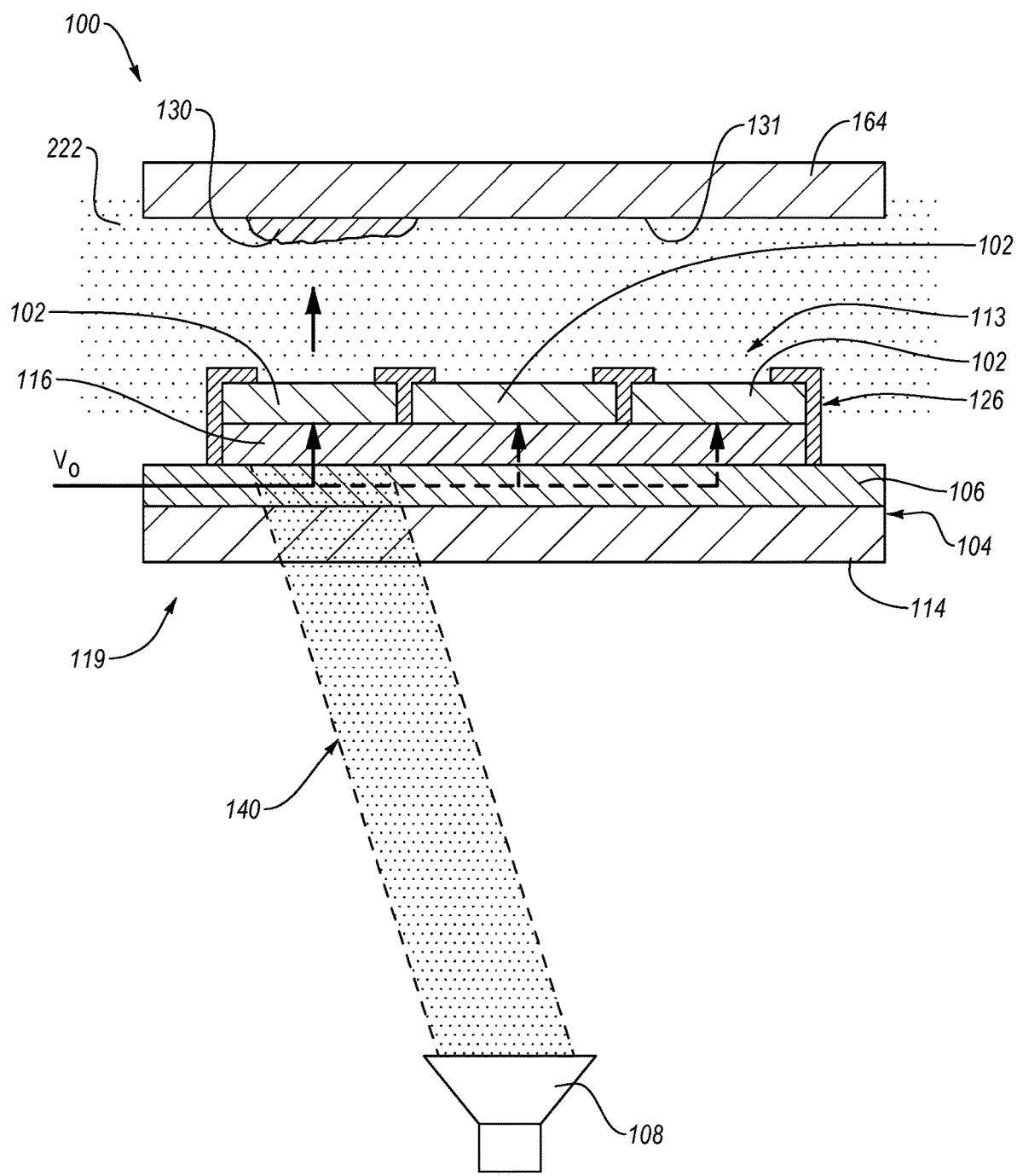
FIG. 12 is a schematic, side elevation, sectional view of an electrochemical-deposition apparatus of the system of FIG. 1, according to one or more examples of the present disclosure.

Now referring to FIG. 12, in some examples, the electrochemical-deposition apparatus 100 includes a photoconductor 116 that is electrically coupled with multiple deposition electrodes 102. According to one example, the photoconductor 116 is a sheet made of a photoconductive material.

In one example of the electrochemical-deposition apparatus 100 of FIG. 12, which is not shown, when electromagnetic radiation illuminates any portion of the photoconductor 116, an electric current is established through the photoconductor 116 and each one of the deposition electrodes 102 electrically coupled with the photoconductor 116. In this manner, a single photoconductor 116 enables the deposition of the material 130 onto multiple locations of the target electrode 164 corresponding with the locations of the deposition electrodes 102.

However, in another example of the electrochemical-deposition apparatus 100 of FIG. 12, which is shown, when electromagnetic radiation illuminates just a portion of the photoconductor 116, an electric current is established only through that portion of the photoconductor 116, so that an electric current is established in only the deposition electrode(s) 102 electrically coupled to that portion of the photoconductor 116. In such a configuration, the photoconductive material of the photoconductor 116 is selected so that electrical conductivity in a lateral direction is restricted. In this manner, a single photoconductor 116 can enable the deposition of the material 130 onto locations of the target electrode 164 corresponding with less than all of the locations of the deposition electrodes 102 electrically coupled with the photoconductor 116.

Figure 13:
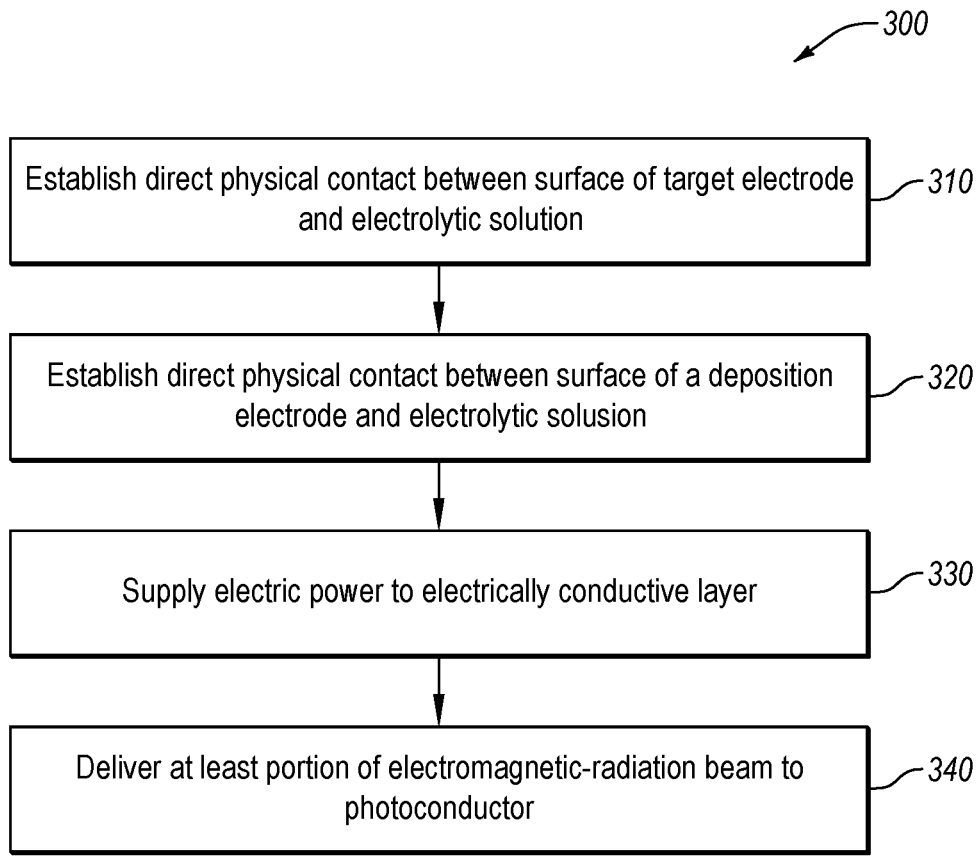
FIG. 13 is a block diagram of a method of electroplating a target electrode, according to one or more examples of the present disclosure.

Referring to FIG. 13, according to one example, a method 300 of electroplating a target electrode 164 is shown. The method 300 includes (block 310) establishing direct physical contact between a surface of the target electrode 164 and the electrolytic solution 222. The method 300 also includes (block 320) establishing direct physical contact between a surface of the deposition electrode 102 and the electrolytic solution 222. The method 300 further includes (block 330) supplying electric power to the electrically conductive layer 104. The method 300 additionally includes (block 340) delivering at least a portion of the electromagnetic radiation 140 to the photoconductor 116, so that an electric current is established through the electrically conductive layer 104, the photoconductor 116, the deposition electrode 102, the electrolytic solution 222, and the target electrode 164, and so that a quantity of the electrically charged material in the electrolytic solution 222 is electroplated onto at least a portion of the surface of the target electrode 164 in direct physical contact with the electrolytic solution 222.

According to some examples of the method 300, the step of establishing direct physical contact between a surface of the deposition electrode 102 and the electrolytic solution 222 includes establishing direct physical contact between surfaces of a plurality of deposition electrodes 102 and the electrolytic solution 222. Also, the step of delivering the at least the portion of the electromagnetic radiation 140 to the photoconductor 116 comprises delivering the at least the portion of the electromagnetic radiation 140 to at least two of a plurality of photoconductors 116 or delivering a plurality of amounts of electromagnetic radiation 140 to a corresponding one or multiple ones of the plurality of photoconductors 116.

In certain examples of the method 300, the step of delivering the at least the portion of the electromagnetic radiation 140 to the photoconductor 116 includes adjusting at least one of an intensity or a quantity of the at least the portion of the electromagnetic radiation 140 delivered to the photoconductor 116 so that an amplitude (e.g., intensity) of the electric current, established through the electrically conductive layer 104, the photoconductor 116, the deposition electrode 102, the electrolytic solution 222, and the target electrode 164, is adjusted, and the quantity of the electrically charged material electroplated onto the at least the portion of the surface of the target electrode 164 is adjusted.

According to some examples of the method 300, the step of delivering the at least the portion of the electromagnetic radiation 140 further includes passing the at least the portion of the electromagnetic radiation 140 through the electrically conductive layer 104 before delivering the at least the portion of the electromagnetic radiation 140 to the photoconductor 116.

Other features and steps of the electrochemical-deposition system 200 and the method 300, respectively, can be found in U.S. patent application Ser. No. 17/112,909, filed December 2020, which is incorporated herein by reference in its entirety.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagram. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for examples may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the examples may be combined in any suitable manner. In the above description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described above with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods and program products according to various examples. In this regard, each block in the schematic flowchart diagrams and/or schematic block diagrams may represent a module, segment, or portion of code, which comprises one or more executable instructions of the code for implementing the specified logical function(s).

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An electrochemical-deposition apparatus, comprising:
   an electrode array comprising deposition electrodes;
   a photoconductor electrically coupled with at least one of the deposition electrodes;
   an electrically conductive layer electrically coupled with the photoconductor and positioned so that the photoconductor is electrically interposed between the at least one deposition electrode and the electrically conductive layer;
   an electromagnetic-radiation emitter configured to generate electromagnetic radiation and positioned so that, when generated, at least a portion of the electromagnetic radiation illuminates the photoconductor;
   an electric-power source configured to supply electric power to the electrically conductive layer; and
   a controller configured to:
     direct the electric power to be supplied from the electric-power source to the electrically conductive layer; and
     direct the electromagnetic-radiation emitter to generate the electromagnetic radiation when the electric power is supplied to the electrically conductive layer,
   wherein when the electric power is supplied to the electrically conductive layer, and:
     when the electromagnetic radiation is generated so that the photoconductor is illuminated at a first radiation level, a first level of electric current is enabled through the photoconductor and the at least one deposition electrode; and
     when the electromagnetic radiation is generated so that the photoconductor is illuminated at a second radiation level, a second level of electric current is enabled through the photoconductor and the at least one deposition electrode, the second level of the electric current is different than the first level of the electric current.

2. The electrochemical-deposition apparatus according to claim 1, wherein:
   the electrically conductive layer is interposed between the electromagnetic-radiation emitter and the photoconductor; and
   when generated, at least a portion of the electromagnetic radiation passes through the electrically conductive layer and illuminates the photoconductor.

3. The electrochemical-deposition apparatus according to claim 2, wherein the electrically conductive layer comprises an electrically conductive material that is at least partially transparent to the at least the portion of the electromagnetic radiation.

4. The electrochemical-deposition apparatus according to claim 3, wherein:
   the electromagnetic radiation is one of visible light or non-visible light; and
   the electrically conductive material is transparent to the one of the visible light or the non-visible light.

5. The electrochemical-deposition apparatus according to claim 3, wherein the electrically conductive material comprises an aperture through which the at least the portion of the electromagnetic radiation is passable from the electromagnetic-radiation emitter to the photoconductor.

6. The electrochemical-deposition apparatus according to claim 3, wherein:
   the electrically conductive layer further comprises an electrically non-conductive substrate;

the electrically non-conductive substrate is at least partially transparent to the at least the portion of the electromagnetic radiation; and the electrically non-conductive substrate is interposed between the electrically conductive material and the electromagnetic-radiation emitter so that, when generated, the at least the portion of the electromagnetic radiation passes through the electrically non-conductive substrate.

7. The electrochemical-deposition apparatus according to claim 1, further comprising a photoconductor array comprising a plurality of photoconductors, wherein the photoconductor is one of the plurality of photoconductors and each one of the plurality of photoconductors is electrically coupled with a corresponding one or more of the deposition electrodes, wherein the electromagnetic-radiation emitter is configured to generate the electromagnetic radiation so that, when generated, at least the portion of the electromagnetic radiation illuminates any one or more of the plurality of photoconductors.

8. The electrochemical-deposition apparatus according to claim 7, wherein when the electromagnetic radiation is generated:
the electromagnetic radiation illuminates at least two of the plurality of photoconductors;
a first one of the at least two of the plurality of photoconductors receives a first quantity of the electromagnetic radiation;
a second one of the at least two of the plurality of photoconductors receives a second quantity of the electromagnetic radiation; and
the first quantity is different than the second quantity.

9. The electrochemical-deposition apparatus according to claim 7, wherein the electromagnetic-radiation emitter is movable relative to the photoconductor array.

10. The electrochemical-deposition apparatus according to claim 7, wherein the electromagnetic-radiation emitter comprises a plurality of electromagnetic-radiation-generating elements spaced apart from each other and each configured to one of:
selectively generate the electromagnetic radiation; or
selectively permit the electromagnetic radiation to pass therethrough.

11. The electrochemical-deposition apparatus according to claim 1, wherein:
the electromagnetic-radiation emitter comprises a laser; and
the electromagnetic radiation is a laser beam.

12. The electrochemical-deposition apparatus according to claim 1, wherein the electromagnetic-radiation emitter comprises a light-emitting diode.

13. The electrochemical-deposition apparatus according to claim 1, wherein:
the electromagnetic-radiation emitter comprises a liquid crystal display and a backlight source; and
the liquid crystal display is interposed between the backlight source and the photoconductor.

14. An electrochemical-deposition system, comprising:
an electrolytic solution;
a target electrode positionable so that a surface of the target electrode is in direct physical contact with the electrolytic solution; and
an electrochemical-deposition apparatus, comprising:
a deposition electrode positionable so that a surface of the deposition electrode is in direct physical contact with the electrolytic solution;
a photoconductor electrically coupled with the deposition electrode;
an electrically conductive layer electrically coupled with the photoconductor and positioned so that the photoconductor is electrically interposed between the deposition electrode and the electrically conductive layer; and
an electromagnetic-radiation emitter configured to generate electromagnetic radiation and positioned so that, when generated, at least a portion of the electromagnetic radiation illuminates the photoconductor which, when the surface of the target electrode and the surface of the deposition electrode are in direct physical contact with the electrolytic solution, establishes an electric current through the photoconductor, the deposition electrode, the electrolytic solution, and the target electrode to electroplate a quantity of electrically charged material in the electrolytic solution onto the surface of the target electrode.

15. The electrochemical-deposition system according to claim 14, wherein:
the electrochemical-deposition apparatus further comprises:
a plurality of deposition electrodes; and
a plurality of photoconductors, each electrically coupled with a corresponding one of the plurality of deposition electrodes; and
the electromagnetic-radiation emitter is configured to selectively generate separate quantities of the electromagnetic radiation so that, when generated, at least a portion of each one of the separate quantities of the electromagnetic radiation illuminates a corresponding one or corresponding ones of the plurality of photoconductors.

16. The electrochemical-deposition system according to claim 14, wherein when the surface of the target electrode and the surface of the deposition electrode are in direct physical contact with the electrolytic solution:
the electrically conductive layer is interposed between the electromagnetic-radiation emitter and the photoconductor; and
when generated, at least a portion of the electromagnetic radiation passes through the electrically conductive layer and illuminates the photoconductor.

17. A method of electroplating a target electrode, the method comprising steps of:
establishing direct physical contact between a surface of the target electrode and an electrolytic solution comprising electrically charged material;
establishing direct physical contact between a surface of a deposition electrode and the electrolytic solution;
supplying electric power to an electrically conductive layer; and
delivering at least a portion of electromagnetic radiation to a photoconductor that is electrically coupled with the deposition electrode and with the electrically conductive layer so that:
an electric current is established through the electrically conductive layer, the photoconductor, the deposition electrode, the electrolytic solution, and the target electrode; and
a quantity of the electrically charged material in the electrolytic solution is electroplated onto at least a portion of the surface of the target electrode in direct physical contact with the electrolytic solution.

18. The method according to claim 17, wherein:
- the step of establishing direct physical contact between the surface of the deposition electrode and the electrolytic solution comprises establishing direct physical contact between surfaces of a plurality of deposition electrodes and the electrolytic solution; and
- the step of delivering the at least the portion of the electromagnetic radiation to the photoconductor comprises delivering the at least the portion of the electromagnetic radiation to at least two of a plurality of photoconductors or delivering a plurality of amounts of the electromagnetic radiation to a corresponding one or multiple ones of the plurality of photoconductors.

19. The method according to claim 17, wherein the step of delivering the at least the portion of the electromagnetic radiation to the photoconductor comprises adjusting at least one of an intensity or a quantity of the at least the portion of the electromagnetic radiation delivered to the photoconductor so that an amplitude of the electric current established through the electrically conductive layer, the photoconductor, the deposition electrode, the electrolytic solution, and the target electrode is adjusted, and the quantity of the electrically charged material electroplated onto the at least the portion of the surface of the target electrode is adjusted.

20. The method according to claim 17, wherein the step of delivering the at least the portion of the electromagnetic radiation further comprises passing the at least the portion of the electromagnetic radiation through the electrically conductive layer before delivering the at least the portion of the electromagnetic radiation to the photoconductor.

* * * * *